(12) United States Patent
Sinha

(10) Patent No.: US 10,266,196 B1
(45) Date of Patent: Apr. 23, 2019

(54) SMART SHOPPING TROLLEY

(71) Applicant: Somnath Sinha, London (GB)

(72) Inventor: Somnath Sinha, London (GB)

( * ) Notice: Subject to any disclaimer, the term of this patent is extended or adjusted under 35 U.S.C. 154(b) by 0 days.

(21) Appl. No.: 16/049,137

(22) Filed: Jul. 30, 2018

(51) Int. Cl.
| | |
|---|---|
| *B62B 5/00* | (2006.01) |
| *B62B 3/14* | (2006.01) |
| *G06Q 30/06* | (2012.01) |
| *G06Q 99/00* | (2006.01) |
| *B62B 5/06* | (2006.01) |
| *B62B 3/00* | (2006.01) |

(52) U.S. Cl.
CPC ............ *B62B 5/0096* (2013.01); *B62B 3/008* (2013.01); *B62B 3/1416* (2013.01); *B62B 3/1424* (2013.01); *B62B 5/06* (2013.01); *G06Q 30/0633* (2013.01); *G06Q 99/00* (2013.01)

(58) Field of Classification Search
None
See application file for complete search history.

(56) References Cited

U.S. PATENT DOCUMENTS

| | | | | |
|---|---|---|---|---|
| 3,627,344 A | * | 12/1971 | Rizzuto | B62B 1/002 280/35 |
| 5,943,735 A | * | 8/1999 | Walker | B60B 33/023 16/35 D |
| 6,484,929 B2 | * | 11/2002 | Sumpmann | B65D 5/12 220/258.3 |
| 6,910,697 B2 | | 6/2005 | Varatharajah et al. | |
| 7,780,081 B1 | * | 8/2010 | Liang | G06Q 30/0633 235/383 |
| 7,944,354 B2 | * | 5/2011 | Kangas | G07G 1/0081 340/568.5 |

(Continued)

FOREIGN PATENT DOCUMENTS

| | | |
|---|---|---|
| EP | 3252913 A1 | 12/2017 |
| NL | 1030833 C1 * | 5/2006 |

(Continued)

OTHER PUBLICATIONS

Iyappan, P., et al., "Enhanced Shopping Market Model for Improving Smartness in Markets Using SABIS Architecture," 2016 IInternational Conference on Wireless Communications, Signal Processing, and Networking (WISPNET), pp. 140-145, Mar. 1, 2016.*

(Continued)

*Primary Examiner* — Nicholas D Rosen
(74) *Attorney, Agent, or Firm* — Marshall, Gerstein & Borun LLP

(57) ABSTRACT

A shopping trolley includes a basket, two or more wheel assemblies, a chassis coupled to the basket and the two or more wheels assemblies, and a handle assembly. The handle assembly is coupled to the basket and/or the chassis, and includes a handle and one or more optical sensors. The shopping trolley also includes a processing unit that is configured to facilitate classification of items scanned by at least one of the one or more optical sensors, at least in part by (i) processing electronic signals generated by the at least one optical sensor, or (ii) causing a transmitter of the shopping trolley to transmit the first electronic signals, or data derived therefrom, to a server. The shopping trolley also includes a power unit configured to provide power to the processing unit and the one or more optical sensors.

24 Claims, 9 Drawing Sheets

(56) References Cited

U.S. PATENT DOCUMENTS

| | | | |
|---|---|---|---|
| 7,974,889 B2 * | 7/2011 | Raimbeault | G06Q 20/208 705/26.7 |
| 8,672,199 B1 | 3/2014 | Ditore et al. | |
| 9,053,473 B2 * | 6/2015 | Edwards | G06Q 20/208 |
| 9,230,249 B1 | 1/2016 | Vora | |
| 9,908,760 B2 | 3/2018 | High et al. | |
| 10,210,503 B2 * | 2/2019 | Sonnendorfer | G06Q 20/3276 |
| 2004/0073489 A1 * | 4/2004 | Varatharajah | B62B 3/14 705/23 |
| 2009/0106085 A1 * | 4/2009 | Raimbeault | G06Q 20/208 705/14.44 |
| 2009/0140850 A1 * | 6/2009 | Kangas | G07G 1/0081 340/539.1 |
| 2009/0230643 A1 * | 9/2009 | Eckert | B62B 3/14 280/33.998 |
| 2011/0295704 A1 * | 12/2011 | Edwards | G06Q 20/208 705/16 |
| 2014/0001258 A1 * | 1/2014 | Chan | G06Q 10/0875 235/385 |
| 2014/0164176 A1 * | 6/2014 | Kitlyar | G06Q 30/0633 705/26.8 |
| 2014/0214596 A1 * | 7/2014 | Acker, Jr. | G06Q 30/0633 705/26.8 |
| 2015/0032559 A1 * | 1/2015 | Sonnendorfer | H04M 1/0254 705/21 |
| 2015/0095189 A1 * | 4/2015 | Dharssi | G07G 1/0063 705/26.8 |
| 2016/0259346 A1 * | 9/2016 | High | E01H 5/12 |
| 2017/0053326 A1 * | 2/2017 | SivasankaranNair | G06Q 30/0281 |
| 2017/0225701 A1 * | 8/2017 | Kraus | B60R 16/0307 |
| 2017/0316656 A1 | 11/2017 | Chaubard et al. | |
| 2017/0357939 A1 * | 12/2017 | Jones | G06K 9/00671 |
| 2018/0025412 A1 | 1/2018 | Chaubard et al. | |
| 2018/0165670 A1 * | 6/2018 | Bacallao | G06Q 20/00 |
| 2018/0218351 A1 * | 8/2018 | Chaubard | H04N 7/181 |
| 2018/0228281 A1 * | 8/2018 | Biermann | A47B 31/02 |
| 2018/0334182 A1 * | 11/2018 | Bacallao | B62B 5/0096 |
| 2018/0354540 A1 * | 12/2018 | Bacallao | B62B 5/0096 |

FOREIGN PATENT DOCUMENTS

| | | | |
|---|---|---|---|
| NL | 1030835 C1 * | 5/2006 | |
| WO | WO-2017/184003 A1 | 10/2017 | |

OTHER PUBLICATIONS

Ravindranath, K.R. et al., "RFID Based Supermarket Shopping System," 2017 International Conference on Big Data, IoT and Data Science (BID), pp. 143-147, Dec. 1, 2017.*

Anon., "Translation of Dutch patent NL 1030835 C1," Schreiber Translations, Inc., Dec. 13, 2018. (Year: 2018).*

Anon., "Translation of Dutch patent NL 1030833 C1," LinguaLinx Language Solutions, Inc., Dec. 14, 2018. (Year: 2018).*

* cited by examiner

SMART SHOPPING TROLLEY

FIELD OF THE DISCLOSURE

The present disclosure generally relates to shopping trolleys and, more specifically, to trolleys and related technologies that facilitate (e.g., reduce the amount of time required to perform) checkout and/or other shopping-related tasks.

BACKGROUND

For a significant percentage of the world's population, grocery shopping is an inevitable and time-consuming chore. Typically, a customer retrieves a shopping trolley (also referred to as a shopping "cart," in some regions) at a store, and pushes the trolley up and down different aisles of the store in search of food, food-related or other items commonly found in supermarkets around the world (e.g., clothes, DIY ("do it yourself") items, garden supplies, etc.). The customer may randomly roam the aisles in the hope of coming across items that he or she would like to purchase or, perhaps more commonly, may come to the store armed with a grocery list of items to buy. In the latter case, the customer may need to spend a considerable amount of time searching for items on the list, and/or may need to take the time to find and speak to a store employee for guidance.

When the customer does find a desired item, he or she picks up the item and places it in a basket of the trolley (e.g., the main compartment of the basket or, in some trolleys, a smaller, collapsible compartment near the handle), and proceeds to look for the next desired item. When the customer has finished and is ready to leave (e.g., after finding all food items on a grocery list), he or she typically pushes the trolley to a checkout area. This may be an area where a checkout attendant operates a register/terminal, for example, or may be a "self-checkout" payment station. In either case, queues of other customers can cause significant delays, especially at peak shopping times. If the customer goes to an attended checkout lane, he or she typically must take all items out of the trolley basket, and place them on a conveyor (or possibly a counter) to allow the attendant to scan bar codes on the items. Alternatively, if the customer goes to a self-checkout lane or area, he or she must personally scan each item, and place each scanned item in a bag in a designated area equipped with a weight sensor (for security purposes, to ensure that the item weight matches its expected weight). Either one of these procedures (i.e., regular/attended checkout or self-checkout) can cause a significant amount of additional delay, beyond that discussed above. Quite often, customers end up putting in far more effort, and spending far more time, at the grocery store than they would expect, leading to general dissatisfaction.

Similar sources of delay and dissatisfaction can occur in other retail shopping contexts, such as when shopping in so-called "big-box" stores (e.g., department stores), or any other type of store that utilizes conventional shopping trolleys and checkout procedures.

BRIEF SUMMARY

In one aspect, a shopping trolley includes a basket including a basket floor and a plurality of basket walls, two or more wheel assemblies each including a respective wheel, and a chassis coupled to the basket and the two or more wheels assemblies. The shopping trolley also includes a handle assembly coupled to the basket and/or the chassis. The handle assembly includes (i) a handle configured to be gripped by a person manually maneuvering the shopping trolley and (ii) one or more optical sensors. The shopping trolley also includes a processing unit configured to facilitate classification of items scanned by at least one of the one or more optical sensors, at least in part by (i) processing first electronic signals generated by the at least one optical sensor, or (ii) causing a transmitter of the shopping trolley to transmit the first electronic signals, or data derived therefrom, to a server. The shopping trolley also includes a power unit configured to provide power to the processing unit and the one or more optical sensors.

In another aspect, a method for facilitating checkout of items placed in a shopping trolley includes generating first electronic signals by scanning items that are manually placed within a basket of the shopping trolley using one or more optical sensors of the shopping trolley, and classifying, by one or more processors processing the first electronic signals, each of the items that are manually placed within the basket of the shopping trolley as a respective item type.

In another aspect, a shopping trolley add-on kit includes a handle assembly component including one or more optical sensors. The handle assembly component is configured to replace, or couple to, a handle of a shopping trolley. The shopping trolley add-on kit also includes one or more wheel assembly components each including a respective weight sensing component. Each of the one or more wheel assembly components is configured to replace, or couple to, a respective wheel assembly of the shopping trolley. The shopping trolley add-on kit also includes (e.g., within the handle assembly) a processing unit configured to facilitate classification of items scanned by at least one of the one or more optical sensors and weighed by at least one of the one or more weight sensing components, at least in part by (i) processing first electronic signals generated by the at least one optical sensor and second electronic signals generated by the at least one weight sensing component, or (ii) causing a transmitter of the shopping trolley add-on kit to transmit the first electronic signals, or data derived therefrom, and the second electronic signals, or data derived therefrom, to a server. The shopping trolley add-on kit also include (e.g., within the handle assembly and/or at least one of the one or more wheel assembly components) a power unit configured to provide power to at least the processing unit.

BRIEF DESCRIPTION OF THE DRAWINGS

The figures described below depict various aspects of the systems and methods disclosed herein. It should be understood that each figure depicts an embodiment of a particular aspect of the disclosed system and methods, and that each of the figures is intended to accord with a possible embodiment thereof.

DETAILED DESCRIPTION

I. Overview

Figure 1:
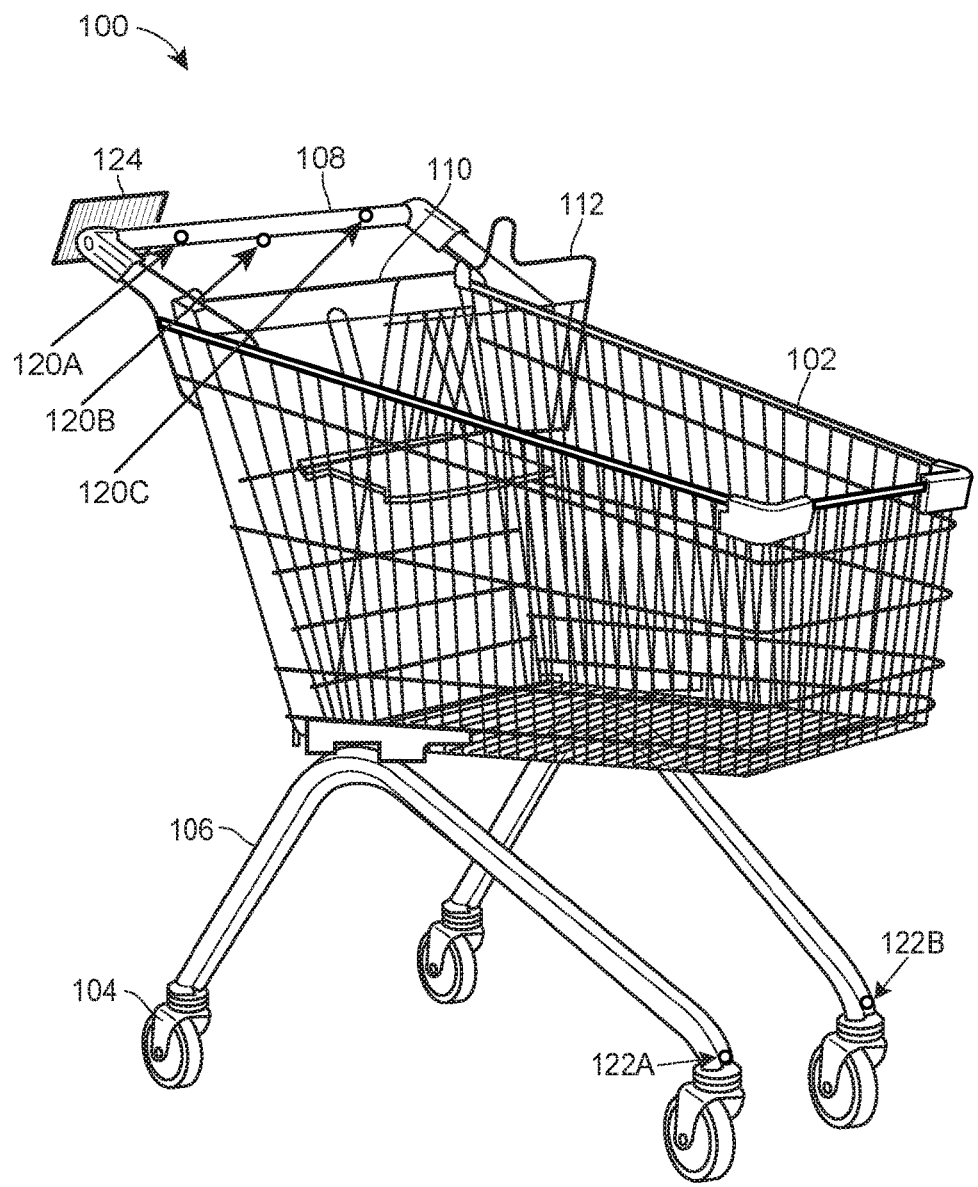
FIG. 1 depicts an example smart shopping trolley that may be used to facilitate and expedite shopping tasks.

The embodiments described herein relate to, inter alia, a "smart" shopping trolley that may improve the retail shopping experience, e.g., by making the shopping experience easier, faster, and/or more enjoyable. The smart shopping trolley may be a conventional shopping trolley (e.g., with basket, chassis, wheels, and a handle) that has been retrofitted with various components, a custom design, or a hybrid of the two.

In some embodiments, the smart shopping trolley includes one or more optical sensors (e.g., barcode scanners, cameras, etc.) positioned on the trolley handle, or positioned on an "add-on" component that is coupled to the trolley handle. The optical sensors may be configured in a forward-facing manner, so as to scan items as the customer using the smart trolley places the items in the trolley basket. Other optical sensors may also be employed. For example, in some embodiments, one or more optical sensors are included on one or more wheel assemblies of the smart trolley, and are configured in an upward-facing manner so as to scan items from below (e.g., as the items rest on the basket floor). Some or all of the optical sensors may also be configured so as to capture images of the environment to one or both sides of the trolley (e.g., including shelves of store aisles, and the items stocked on those shelves).

A processing unit of the smart shopping trolley may identify each item based on the scan(s) of that item, by correlating the scanned code with an item type (e.g., product, label/name, descriptor, etc.) that corresponds to that code. In some embodiments, the trolley also includes one or more weight sensing components, which may be inserted between the wheel(s) and the trolley chassis (e.g., between a wheel bracket and the chassis), for example. The processing unit may compare the weight of the item to the expected weight of the item that was identified via the scanning procedure, in order to confirm that the customer did indeed put the scanned item (rather than a different, or additional, item) in the trolley basket. In other embodiments, the processing unit may implement an object recognition technique (e.g., a trained machine learning model) that accepts one or more item images, the weight of the item, and possibly one or more other pieces of information as input, and classifies the item based on those inputs.

If the item is not successfully classified (e.g., if the weight does not match a barcode scan result, or if a machine learning model cannot classify the item), the processing unit may cause an electronic display of the smart trolley (e.g., an LCD or LED display) to indicate the mismatch, e.g., by turning a particular color (e.g., red) and/or displaying a text message. If the item is successfully classified, however, the processing unit may instead cause the electronic display to show a descriptor and/or price of the added item, and/or a running total of all scanned items in the basket up to that point. As the term is used herein, "successful" classification may refer to a scenario where an item is confidently classified/identified based on the available inputs (e.g., if a machine learning model outputs an item type/class with high confidence), or may refer to a scenario in which no inputs contradict an initial or preliminary classification (e.g., if a weight matches the expected weight of an item that is initially identified via a barcode scan). Thus, for example, an "unsuccessful" classification could mean that an item was confidently classified by one technique (e.g., barcode scan), but contradicted by another technique used for corroboration purposes (e.g., checking whether the item weight matches an expected weight). When classification is successful, the processing unit may cause a speaker of the trolley to emit an audible signal (e.g., a short beep) to indicate the successful addition of the item to the customer's checkout list.

In alternative embodiments and/or scenarios, customers may use the smart shopping trolley by itself, or in concert with a dedicated mobile app (e.g., executing on a customer's smartphone). In the former case, a customer may take any available smart shopping trolley, and begin shopping in the usual manner (e.g., going up and down aisles looking for items on a grocery or other shopping list). As the customer picks items from the shelves and places them in the trolley basket (e.g., either directly onto the basket, or into bags resting within the basket), the items are scanned by one or more of the optical sensors, weighed by the weight sensor(s), and, if successfully classified (e.g., if the weight corroborates the scan results), the processing unit adds the items to an electronic checkout list and updates the electronic display accordingly (e.g., to show the new item and the running total). The electronic display may also show the customer other useful information, such as alternative products/items (e.g., cheaper or better alternatives). When the customer has finished shopping, he or she may go to a checkout aisle or payment station where a number or other code of the smart trolley is scanned (e.g., by a checkout attendant or an automated payment station) or learned by other means (e.g., Bluetooth or WiFi communications, manual entry, etc.). The customer may then use his or her preferred payment method to pay for the items in the smart trolley, via the attendant or the payment station, without ever having unloaded the items onto a conveyor or counter.

In the latter case, where the customer uses a mobile app, the customer may have downloaded the app onto his or her personal mobile device (e.g., smartphone, smart watch, tablet, etc.) before entering the store and, in some embodiments, may have used the mobile app to enter and save a shopping list. When arriving at the store, the customer may use a camera of his/her mobile device, and the mobile app, to scan a visual code (e.g., barcode or QR code) that is printed on, stamped on, or otherwise affixed to a particular smart shopping trolley. The trolley may couple to the customer's mobile device (e.g., via Bluetooth or WiFi) to obtain the shopping list, and access a database and/or map to sequentially guide the customer to the various items on the list via an electronic display of the trolley (or, alternatively, via a user interface generated by the mobile app). As in the first case, the customer picks items from the shelves and places them in the trolley basket, and the items are scanned by the optical sensor(s) and weighed by the weight sensor(s). If an item is successfully classified, the processing unit adds the items to an electronic checkout list and updates the electronic display and/or the mobile device user interface accordingly (e.g., to show the new item and the running total). The electronic display and/or the mobile device user interface may show additional useful information, such as alternative products/items (e.g., cheaper or better alternatives), and/or the next item on the customer's list. When the customer has finished shopping, he or she may select an input on a user interface provided by the mobile app (or, alternatively, an input on the trolley electronic display) to initiate checkout and payment. Payment may be made automatically using information stored in connection with the customer's account (e.g., using stored information of a preregistered credit card account to which the customer previously authorized the store to charge payments), for example.

Using the smart shopping trolley, systems, and methods described above (or other embodiments thereof, including various alternative embodiments discussed below), customers may be presented with a frictionless shopping experience that reduces time, effort and frustration for the customer. Accordingly, stores utilizing smart shopping trolleys and the related systems/methods described herein may realize significant gains in customer satisfaction, and more effectively attract or retain customers.

II. Example Smart Shopping Trolley

FIG. 1 depicts an example smart shopping trolley 100, according to one embodiment of the invention described herein. Trolley 100 includes a basket 102 and four wheel assemblies 104, all of which are coupled to a chassis 106 that connects basket 102 and wheel assemblies 104. A handle assembly 108 is also coupled to basket 102. As will become clear from the description that follows, handle assembly 108 may only include a component that is designed to be grasped by the customer (e.g., as shown in FIG. 1), or may include one or more additional ("add-on") components. Basket 102 includes a floor, three fixed walls (front and both sides), and a collapsible gate 110 that forms the rear wall while also allowing for the "stacking" together of multiple trolleys. Basket 102 also includes a smaller, collapsible compartment 112 that may provide a place to put items, and/or to sit a small child (e.g., with legs extending through gate 110, out the rear of trolley 100). As will be seen from the description that follows, however, in some embodiments it may be preferable to avoid seating children (or placing large items) in collapsible compartment 112, in order to avoid limiting the "vision" of certain optical sensors on handle assembly 108.

Any suitable materials and construction techniques may be used to construct the basket 102 and chassis 106 of trolley 100. For example, basket 102 may be constructed of chrome-plated steel wires or bars that are bolted or welded together, or of high-density polyethylene, etc., and chassis 106 may be constructed of chrome-plated steel tubes (e.g., with an oval cross-section) that are bolted or welded to basket 102 and/or wheel assemblies 104, etc. Examples of wheel assemblies 104 and handle assembly 108 are discussed in further detail below. It is understood that trolley 100 may incorporate other components (e.g., the bumpers shown on basket 102 in FIG. 1, and/or other components not shown in FIG. 1), may omit some components shown in FIG. 1 (e.g., collapsible compartment 112, and/or one of wheel assemblies 104, etc.), and/or may be constructed in a different manner (e.g., with handle assembly 108 being coupled directly to chassis 106 rather than basket 102, and/or with gate 110 instead being a fixed wall, etc.).

Integrated within various components of trolley 100 are a number of optical sensors, including optical sensors 120A through 120C on handle assembly 108, and optical sensors 122A and 122B on two of wheel assemblies 104. Some or all of optical sensors 120A through 120C and/or optical sensors 122A and 122B may be scanners configured to scan specific types of visual codes, such as barcodes or QR codes. Any suitable code scanning technology may be used, such as laser scanning, LED scanning, and so on. Alternatively, or in addition, some or all of optical sensors 120A through 120C and/or optical sensors 122A and 122B may be cameras, such as charge-coupled device (CCD) cameras. As used herein, for ease of explanation, the term "scanning" is broadly used such that it may refer to visual code (e.g., barcode) scanning, and/or to capturing images with a camera. It is understood that there may be some overlap between visual code scanning and image capturing, e.g., if a barcode reader scans barcodes (or alphanumeric codes, etc.) by processing a captured image of the barcode, with the code then being identified using image processing techniques.

At least one of optical sensors 120A through 120C may be configured/positioned in a forward-facing manner, so as to scan items as they enter basket 102, and/or (in some embodiments) while the items are resting within basket 102. One or more of optical sensors 120A through 120C may instead, or also, be configured/positioned (and/or have a wide enough viewing angle) to scan the environment to either side of trolley 100 (and possibly somewhat to the rear and/or front of trolley 100), for purposes that will be discussed further below. At least one of optical sensors 122A and 122 B may be configured/positioned in an upward-facing manner, so as to scan items resting on the floor of basket 102, and/or (in some embodiments) while the items are being placed within basket 102.

In some embodiments, trolley 100 includes a sufficient number of optical sensors, with sufficient viewing angles and appropriate placements, such that substantially an entire planar area across the top of basket 102 is covered (e.g., such that barcodes or QR codes can be scanned, or images captured, for any item place in basket 102, provided that the codes or necessary item features, etc., are not obscured by the customer's hand or by parts of the item itself). In some embodiments, however, such as that shown in FIG. 1, the optical sensors only cover a direction from the rear to the front of basket 102, and from the bottom to the top of basket 102, in which case (if barcodes or other codes are being scanned) it may be necessary for the customer to at some point position the item such that its code faces the back or bottom of basket 102. In some embodiments where trolley 100 includes optical sensors that are configured to scan codes in only certain directions (e.g., when facing the back and/or bottom of basket 102), trolley 100 may be marked (e.g., color-coded) to visually indicate to customers the parts of basket 102 (or elsewhere on trolley 100) where barcodes (or other item codes) should ideally be aimed when items are placed in basket 102. Moreover, in some embodiments, the optical sensors of trolley 100 are also, or instead, configured and positioned to scan items when the items are resting in basket 102, as opposed to when the items are in the process of entering basket 102.

In some embodiments, trolley 100 may include more or fewer optical sensors than are shown in FIG. 1, and/or may include optical sensors in different locations than are shown in FIG. 1. For example, one or more optical sensors may be positioned on chassis 106, and/or on basket 102 (e.g., along the upper edge of basket 102). However, it may be advantageous to limit the optical sensors to wheel assemblies 104 and/or handle assembly 108, in order to allow conventional shopping trolleys to be easily retrofitted and to avoid the cost of a fully custom design.

Trolley 100 also includes an electronic display unit 124. Electronic display unit 124 may use any suitable type of display technology, such as liquid crystal display (LCD) technology, light-emitting diode (LED) technology, organic LED (OLED) technology, and so on. Generally electronic display unit 124 provides a user interface to the customer, e.g., by providing information about scanned items, a total cost of items that have been successfully scanned during a current shopping session, and/or other useful information. In some embodiments, electronic display unit 124 (or another part of trolley 100) includes at least one speaker that is configured to generate audible signals (e.g., a short beep when an item is successfully classified, as discussed further below, or a long beep if the customer's fingers are blocking the view of an item, etc.). Electronic display unit 124 may only display information, or may also accept inputs from the customer (e.g., if electronic display unit 124 is a touch-screen). In some embodiments, electronic display unit 124 (or another unit of trolley 100) may be equipped with a microphone in order to accept voice commands from the customer. In some embodiments (e.g., some embodiments where a customer couples a mobile device/app to trolley 100, as discussed below), trolley 100 does not include electronic display unit 124. Electronic display unit 124 may be positioned anywhere on handle assembly 108 (e.g., to either side, or in the middle).

In some embodiments, trolley 100 includes a number of other types of components not shown in FIG. 1. For example, some or all of wheel assemblies 104 may also include weight sensing components to measure the weight of items placed in basket 102. As another example, handle assembly 108 and/or one or more of wheel assemblies 104 may include a processing unit (or portions thereof), and/or a power unit (or portions thereof) to power the processing unit and/or other components of trolley 100. Possible components of handle assembly 108 will be discussed in further detail below in connection with FIGS. 2A through 2C, and possible components of wheel assemblies 104 will be discussed in further detail below in connection with FIG. 3. Possible processing units and power units will be discussed in further detail below in connection with FIG. 4.

As yet another example, trolley 100 may include one or more units (not shown in FIG. 1) that a customer may use to scan items more robustly, e.g., if one or more initial attempts at classification fail. For example, trolley 100 may include one or more color-coded (e.g., red) modules that are mounted on or near handle assembly 108 (or another suitable location), with each module including a visual code (e.g., barcode) scanner. If a processing unit of trolley 100 does not classify an item properly (e.g., optical sensors 120 and 122 cannot read the code), the customer may hold the item such that its barcode or other visual code is directly in front of (and in close proximity to) one of these additional modules.

As still another example, trolley 100 may include a printer that prints receipts when the shopping transaction has ended. The printer may be mounted on or near the handle assembly 108, for example.

Figure 2A:
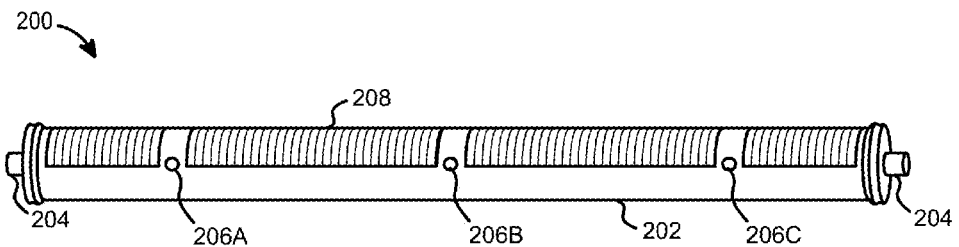
FIGS. 2A through 2C depict example handle assemblies that may be used with a smart shopping trolley.
Figure 2B:
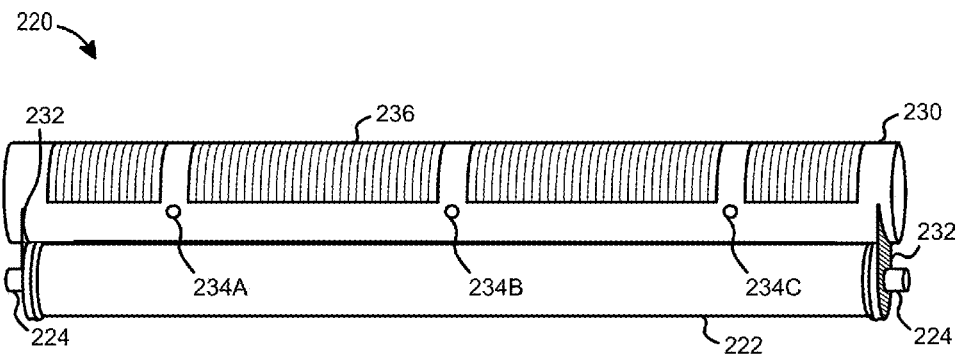
Figure 2C:
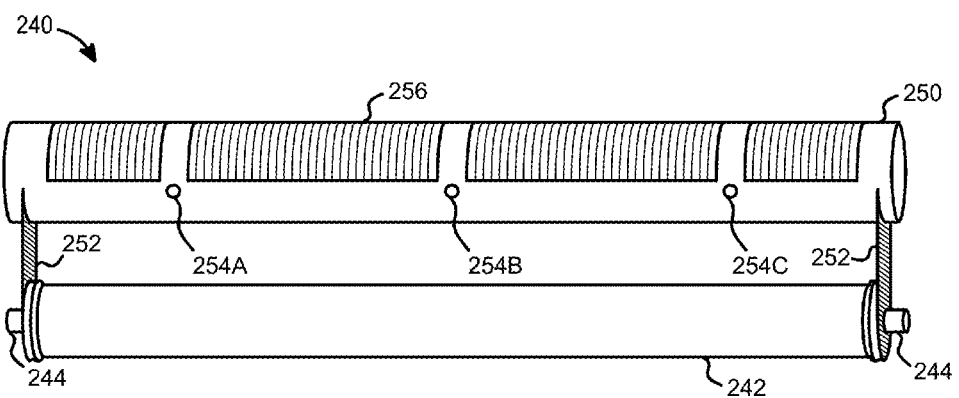

FIGS. 2A through 2C depict example handle assemblies that may be used with a smart trolley, e.g., as handle assembly 108 on trolley 100 of FIG. 1. For ease of explanation, the handle assemblies of FIGS. 2A through 2C will be described with reference to trolley 100 of FIG. 1. Referring first to FIG. 2A, a handle assembly 200 consists of only a handle, i.e., the component that a customer pulls or pushes in order to maneuver trolley 100. Typically, shopping trolleys are designed such that the handle is easily removed and replaced. Thus, in some embodiments, handle assembly 200 may be designed with standard connectors or fittings, and used to retrofit a conventional shopping trolley by removing the original handle and inserting handle assembly 200 in its place.

As seen in FIG. 2A, handle assembly 200 includes a tubular component 202 and end connectors 204 for coupling to a handle support component of trolley 100 (e.g., with the handle support component being coupled to basket 102, as shown in FIG. 1). Handle assembly 200 also includes optical sensors 206A through 206C, which may correspond to optical sensors 120A through 120C of FIG. 1. Alternatively, handle assembly 200 may include more or fewer optical sensors, and/or may include optical sensors in different positions along tubular component 202. In other embodiments, component 202 is not tubular. For example, component 202 may instead have a polygonal cross-section. Tubular component 202 may be formed of any suitable material(s), such as high-density polyurethane, steel, etc.

As is also seen in FIG. 2A, handle assembly includes a number of photovoltaic elements (e.g., cells, panels, etc.) 208. Other embodiments may include more or fewer (e.g., one) photovoltaic elements. Photovoltaic elements 208 may include any suitable semiconductor material capable of converting light into electricity. As will be discussed in further detail below, photovoltaic elements 208 may generate electricity for powering one or more components of trolley 100. Those of skill in the art will understand that the dimensions of photovoltaic elements 208 may be sized based on the requirements of the components being powered, and that handle assembly 200 may include appropriate circuitry to electrically couple photovoltaic elements 208 to the powered component(s), and/or to provide a suitably steady power source to the powered component(s). In some embodiments, photovoltaic elements 208 are electrically coupled, via a charging circuit, to a rechargeable battery, which may be within tubular component 202 or in another location on trolley 100. Tubular component 202 may include a transparent, semi-transparent or translucent outer layer that covers optical sensors 206 and/or photovoltaic elements 208, in order to protect those components without blocking light waves.

Referring next to FIG. 2B, a handle assembly 220 includes both a conventional handle and an "add-on" component that may be fitted just above the handle. Handle assembly 220 includes a tubular component 222 and end connectors 224 for coupling to a handle support component of trolley 100 (e.g., with the handle support component being coupled to basket 102, as shown in FIG. 1). Tubular component 222 (or another shaped component, e.g., with a polygonal cross-section) and end connectors 224 may be the handle of a conventional trolley that is being retrofitted, for example.

Handle assembly 220 also includes an add-on component 230. While add-on component 230 is depicted in FIG. 2B as having a tubular shape, other shapes are possible. For example, add-on component 230 may have a polygonal cross-section, or may be a substantially flat/planar component, etc. Add-on component 230 is coupled to end connectors 224 via connectors 232. Connectors 232 may be included with add-on component 230 in a retrofitting kit, for example, and connectors 232 may snap or slide over a portion of end connectors 224 when the original handle of a trolley is temporarily removed during the retrofit process. In other embodiments, add-on component 230 may snap on to tubular component 222, or may be affixed to tubular component 222 or end connectors 224 by other suitable means (e.g., bolts, welding, etc.). Add-on component 230 includes optical sensors 234A through 234C and a number of photovoltaic elements 236, which may be similar to optical sensors 206A through 206C and photovoltaic element(s) 208, respectively, of FIG. 2A, for example. By being mounted above tubular component 222, add-on component 230 may be protected from impact with other trolleys when trolley 100 is stacked with one or more other trolleys. In some embodiments, add-on component 230 includes transparent, semi-transparent or translucent outer layer that covers optical sensors 234 and/or photovoltaic elements 236, in order to protect those components without blocking light waves.

Referring next to FIG. 2C, a handle assembly 240 includes both a conventional handle and an "add-on" component that may be fitted above the handle, but (unlike handle assembly 220) with an air gap between the two. Handle assembly 240 includes a tubular component 242 and end connectors 244 for coupling to a handle support component of trolley 100 (e.g., with the handle support component being coupled to basket 102, as shown in FIG. 1). Tubular component 242 (or another shaped component, e.g., with a polygonal cross-section) and end connectors 244 may be the handle of a conventional trolley that is being retrofitted, for example.

Handle assembly 240 also includes an add-on component 250. While add-on component 250 is depicted in FIG. 2C as having a tubular shape, other shapes are possible. For example, add-on component 250 may have a polygonal cross-section, or may be a substantially flat/planar component, etc. Add-on component 250 is coupled to end connectors 244 via connectors 252. Connectors 252 may be included with add-on component 250 in a retrofitting kit, for example, and connectors 252 may snap or slide over a portion of end connectors 254 when the original handle of a trolley is temporarily removed during the retrofit process. In other embodiments, add-on component 250 may snap on to tubular component 242, or may be affixed to tubular component 252 or end connectors 254 by other suitable means (e.g., bolts, welding, etc.). Add-on component 250 includes optical sensors 254A through 254C and a number of photovoltaic elements 256, which may be similar to optical sensors 206A through 206C and photovoltaic element(s) 208, respectively, of FIG. 2A, for example. By being mounted above tubular component 242, add-on component 250 may be protected from impact with other trolleys when trolley 100 is stacked with one or more other trolleys. Moreover, the air gap between add-on component 250 and tubular component 242 (e.g., 5 centimeters, or 10 centimeters, etc.) may allow a customer to more easily grasp tubular component 242, without interfering with or damaging optical sensors 254 and/or photovoltaic element(s) 256. In some embodiments, add-on component 250 includes transparent, semi-transparent or translucent outer layer that covers optical sensors 254 and/or photovoltaic elements 256, in order to protect those components without blocking light waves.

Figure 3:
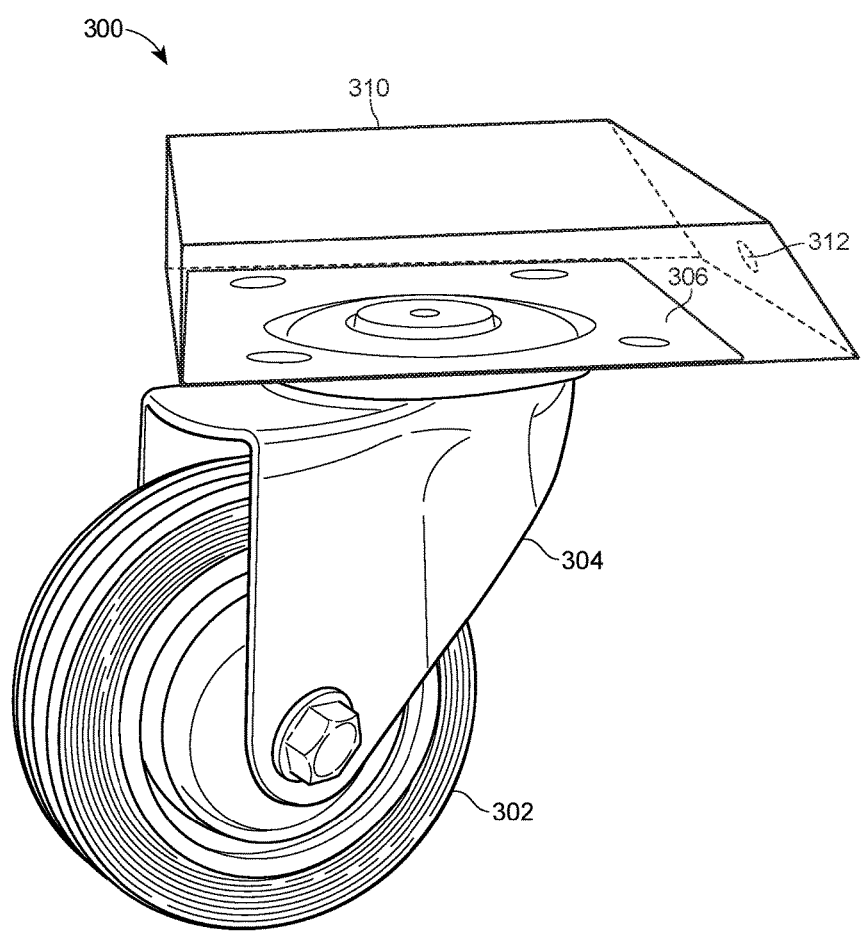
FIG. 3 depicts an example wheel assembly that may be used with a smart shopping trolley.

FIG. 3 depicts an example wheel assembly 300 that may be used with a smart trolley, e.g., as each of one, two, three or four of wheel assemblies 104 on trolley 100 of FIG. 1. For ease of explanation, wheel assembly 300 of FIG. 3 will be described with reference to trolley 100 of FIG. 1. Wheel assembly 300 includes a caster comprising a wheel 302, bracket 304, and a wheel base 306. The caster may be fixed, or may swivel/rotate (e.g., rotate about a center axis of wheel base 306). Wheel 302, bracket 304, and wheel base 306 may be formed of any suitable materials (such as, for example, natural or synthetic rubber, steel, and high-density polyurethane, respectively).

Mounted on top of wheel base 306 is a weight sensing component 310. Weight sensing component 310 may be a module that is coupled to wheel base 306 by bolts, screws, a snap-fit assembly, glue, and/or any other suitable means.

Similarly, the top surface of weight sensing component 310 may be coupled to a chassis (e.g., chassis 106 of FIG. 1) by bolts, screws, a snap-fit assembly, glue, and/or any other suitable means.

In some embodiments, weight sensing component 310 incorporates a load cell to convert a force exerted upon a plate of weight sensing component 310 to an electronic signal. For example, weight sensing component 310 may include a number of metal bar or strips attached to strain gauges, with one end of the load cell being attached to a top (or bottom) plate of weight sensing component 310, and the other end being attached to the bottom (or top) of weight sensing component 310. Weight sensing component 310 may also include other components of a weight sensor, such as an analog-to-digital converter, for example.

In some embodiments, weight sensing component 310 is integrated with an optical sensor 312, which may be one of optical sensors 122 of FIG. 1 (described above), for example. In other embodiments, weight sensing component 310 may include more than one optical sensor, or no optical sensors. Further, in some embodiments, weight sensing component 310 may include at least a portion of a power unit that powers the weight sensor of weight sensing component 310, optical sensor 312, and/or one or more other components of trolley 100. As one example, weight sensing component 310 may include a motion powered power unit that charges in response to the turning of wheel 302. The motion powered unit may include a rechargeable battery or supercap (supercapacitor), for example. Alternatively, a wheel powered supercap or battery may be located inside the handle assembly (e.g., handle assembly 108 of FIG. 1) or another location, and be electrically coupled to wheel assembly 300. For instance, a rechargeable battery or supercap may be fitted inside the handle, or an undercarriage of the chassis, with enough clearance to allow trolley 100 to be stacked with other trolleys without causing damage.

As with handle assembly 200, add-on component 230, and add-on component 250 of FIGS. 2A through 2C, weight sensing component 310 may be a part of a retrofit kit. For example, weight sensing component 310 may be mountable between the chassis and each wheel assembly of a conventional shopping trolley. If one such component is added for each wheel, the weight sensing components may collectively detect the weight of items placed in basket 102 of trolley 100 (and/or on the undercarriage below basket 102), for example, and possibly detect the specific distribution of weight caused by a given item. In some embodiments, different weight sensing components are used for different wheels. For example, weight sensing components for the front two wheels may be equipped with a weight sensor as well as optical sensors similar to optical sensor 312, while weight sensing components for the rear two wheels may only be equipped with weight sensors. As another example, only the weight sensing components for the rear two wheels may be equipped with, or coupled to, a motion powered unit.

Figure 4:
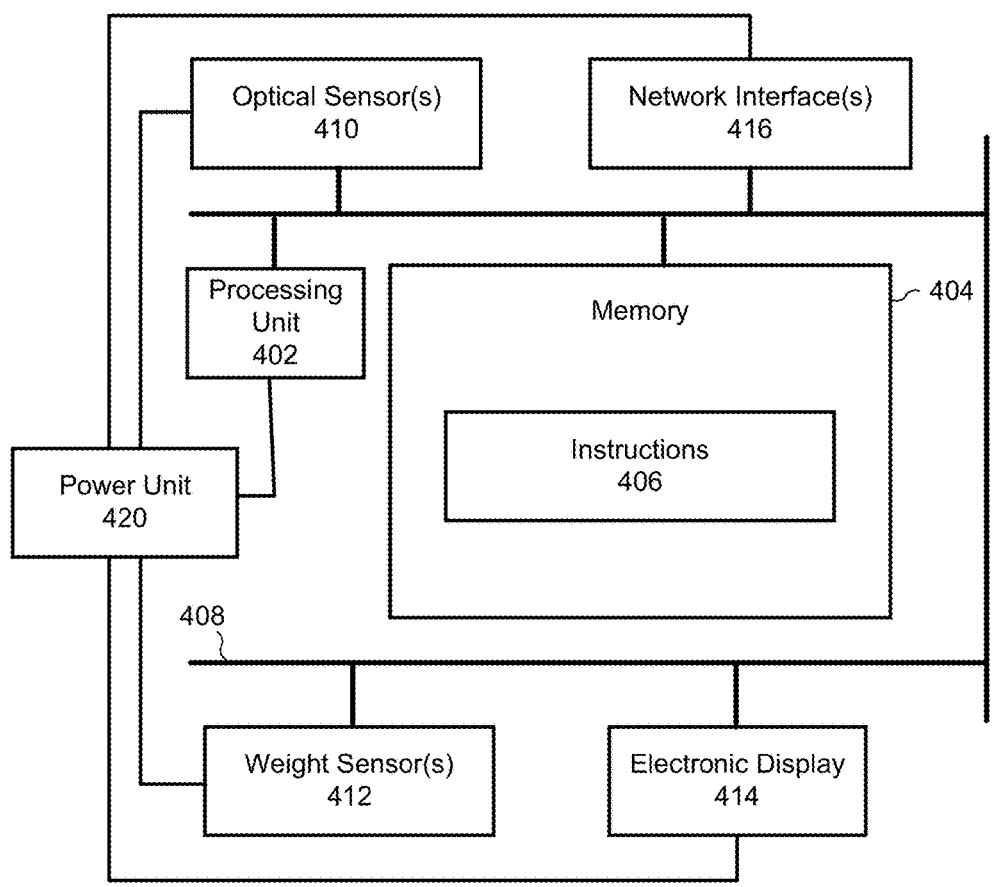
FIG. 4 is a block diagram of an example electronic component system of a smart shopping trolley.

FIG. 4 is a block diagram of an example electronic component system 400 of a smart shopping trolley, such as trolley 100 of FIG. 1. As seen in FIG. 4, electronic component system 400 includes a processing unit 402 and a memory 404 storing instructions 406. Processing unit 402 includes one or more processors, each of which may be a programmable microprocessor that executes software instructions (including the instructions 406) stored in memory 404. Alternatively, one, some or all of the processors in processing unit 402 may be other types of processors (e.g., ASICs, FPGAs, etc.), and the functionality of instructions 406 as described herein may instead be implemented, in part or in whole, in hardware. Memory 404 may include one or more physical memory devices with volatile and/or non-volatile memory. Any suitable memory type or types may be used, such as read-only memory (ROM), solid-state drives (SSDs), hard disk drives (HDDs), and so on.

Processing unit 402 is coupled to memory 404 via a network (e.g., bus) 408. Network 408 may be a single wired network, or may include any suitable number of wired and/or wireless networks. For example, network 408 may be or include a controller area network (CAN) bus, a Local Interconnect Network (LNN) bus, and so on. In some embodiments, network 408 is primarily or wholly wireless, in order to facilitate retrofitting of conventional trolleys that may not permit easy access to interior portions of the trolley (e.g., inside steel tubes used for the chassis, or inside steel frame members of the basket that may not even be hollow, etc.). In such implementations, network 408 may include a short-range communication network, such as Bluetooth. In other embodiments, network 408 is fully wired, e.g., with wires that are routed along the same paths as power lines (discussed further below).

Also coupled to network 408 are one or more optical sensors 410, one or more weight sensors 412, an electronic display 414, and one or more network interfaces 416. Optical sensor(s) 410 may include optical sensors on a handle assembly (e.g., optical sensors 120 of FIG. 1, optical sensors 206 of FIG. 2A, optical sensors 234 of FIG. 2B, or optical sensors 254 of FIG. 2C), on one or more wheel assemblies (e.g., optical sensors 122 of FIG. 1, or one or more of optical sensor 312 of FIG. 3), and/or one or more other optical sensors in other locations (e.g., on the underside of the trolley basket floor, on the chassis, on the side walls of the trolley basket, etc.). Optical sensor(s) 410 may be of one or more types (e.g., barcode scanner, camera, etc.), and may be configured in various ways, e.g., as discussed above in connection with FIGS. 1 and 2.

Weight sensor(s) 412 may include weight sensing components in one or more wheel assemblies of the trolley, e.g., as discussed above in connection with FIGS. 1 and 3. Alternatively, or in addition, weight sensor(s) 412 may include one or more weight sensors in another location. For example, weight sensor(s) 412 may include one or more load cells positioned between the trolley chassis and a platform that supports the floor of the trolley basket, and/or one or more load cells positioned between all of the wheel assemblies and a single platform or undercarriage at the bottom of the chassis (e.g., for larger or heavier items that are not placed in the trolley basket), etc.

Electronic display 414 is generally configured to present information to customers, and possibly to receive customer inputs as well (e.g., if electronic display 414 is a touch screen). Electronic display 414 may be electronic display unit 124 of FIG. 1, for example. In some embodiments, electronic display 414 (or another unit of electronic component system 400, not shown in FIG. 4) also includes one or more microphones, in order to accept voice commands from customers.

Network interface(s) 416 may include hardware (including a transmitter with at least one antenna, and possibly a receiver), firmware and/or software configured to communicate via one or more short-range communication protocols (e.g., Bluetooth, WiFi, near field communications (NFC), etc.), and/or one or more long-range communication protocols (e.g., cellular). Precisely which type or types of communication links must be supported by network interface(s) 416 may depend on the embodiment, e.g., as will be seen when describing various use cases below in connection with FIGS. 5 and 6.

Processing unit 402 (e.g., when executing instructions 406) is generally configured to classify items placed in the trolley basket, as the items are being placed in the basket and/or (in some embodiments) when the items are resting within the basket. To this end, processing unit 402 may analyze electronic signals generated by some or all of optical sensor(s) 410 and/or electronic signals generated by some or all of weight sensor(s) 412. In some embodiments, processing unit 402 detects whether the customer (or another object) is making classification impossible by blocking the view of one or more of optical sensor(s) 410, and causes a speaker of the trolley (e.g., in the handle assembly) to emit an audible signal (e.g., long beep) if such an obstruction is detected.

In some embodiments where optical sensor(s) 410 include one or more barcode scanners/readers, for example, processing unit 402 uses the scanned code of an item as a key to a database (e.g., stored locally in memory 404, or accessed via one of network interface(s) 416) to determine an expected weight or weight range of the matching item. Processing unit 402 may then analyze electronic signals from one or more of weight sensor(s) 412 to determine whether the weight of the item, when resting in the trolley basket (e.g., on the basket floor, or in a collapsible compartment of the basket), corresponds to the expected weight (e.g., within some predetermined tolerance such as +/−3%) or expected weight range.

If the weight matches (i.e., is sufficiently close to) the expected weight, processing unit 402 may classify the item as the item corresponding to the scanned code, add the item to an electronic checkout list, and cause electronic display 414 to present a description and cost of the item (and possibly a running total of all items successfully classified during the shopping session). If there is not a match, processing unit 402 may not add the item to the checkout list, and may cause electronic display 414 to turn a particular color (e.g., red), present a text message indicating failure, and/or to generate an audible signal (e.g., a series of three brief, relatively harsh sounding tones). In some embodiments, processing unit 402 may also cause an alert to be sent to an attendant computing system (e.g., via one of network interface(s) 416) if the weight does not match, to prompt an attendant to assist the customer.

In some embodiments where optical sensor(s) 410 include one or more cameras, the electronic signals processed by processing unit 402 include one or more images of an item that is being, or has been, added to the basket. In one such embodiment, processing unit 402 uses an object recognition technique, such as a trained machine learning model (e.g., a convolutional neural network), to classify the item pictured in the image(s). If a machine learning model is used, the model may have been trained using supervised learning techniques (e.g., using numerous item images that have been manually labeled/classified by a human). The machine learning model may also make use of other inputs, such as the weight indicated by the electronic signals from one or more of weight sensor(s) 412. If weight is not used as an input to the machine learning model, weight sensor(s) 412 may be omitted.

In other embodiments, the machine learning feature set is expanded to include still other inputs, such as weight distribution (e.g., a highly localized weight on just one of multiple weight sensors may indicate a smaller item), images of the shelved items to either side of the trolley (representing the set of items from among which the customer likely chose the current item), and so on. If the machine learning model is able to classify an item with a sufficient confidence level (e.g., 99.999%), processing unit 402 may add the item to a checkout list, and cause electronic display 414 to present a description and cost of the item (and possibly a running total of all items successfully classified during the shopping session). If the machine learning model cannot classify the item with a sufficient confidence level, processing unit 402 may not add the item to the checkout list, and may cause electronic display 414 to turn a particular color (e.g., red), present a text message indicating failure, and/or to generate an audible signal. In some embodiments, processing unit 402 may cause an alert to be sent to an attendant computing system (e.g., via one of network interface(s) 416) if the item cannot be classified, to prompt the attendant to assist the customer.

The machine learning model may also be trained to inherently distinguish item weights from weights associated with other sources (e.g., the weight of a customer leaning on the handle assembly or a wall of the trolley basket, or the weight of bags placed within the trolley). In some embodiments, processing unit 402 may manage an initialization/calibration procedure in which an initial amount of weight (e.g., the weight of grocery bags in the basket) is zeroed out prior to placing items in the basket.

In an alternative embodiment, processing unit 402 classifies items based on item codes or descriptors entered by the customer via electronic display 414 (e.g., using touch inputs on a graphical user interface generated by processing unit 402), via the customer's mobile device (e.g., if executing an app that then transfers the codes/descriptors to the trolley), or via voice (e.g., if electronic display 414 or another unit of electronic component system 400 includes a microphone, and if processing unit 402 utilizes any suitable voice recognition technology). In such embodiments, processing unit 402 may confirm the user-entered information by analyzing the weight of the item as indicated by electronic signals from one or more of weight sensor(s) 412 (e.g., by accessing a database of expected weights or weight ranges, as described above), and optical sensor(s) 410 may or may not be omitted. If the item weight matches the user-entered description or code, processing unit 402 adds the item to the electronic checkout list.

In some embodiments, one or more of optical sensor(s) 410 is a special-purpose or "hot zone" visual code scanner (e.g. barcode scanner), to be used in the event that a customer has trouble scanning an item merely by placing the item in the trolley basket (e.g., as discussed above in connection with FIG. 1). In such an embodiment, processing unit 402 may also be configured to classify items using the special-purpose scanner (e.g., as confirmed by electronic signals from one or more of weight sensor(s) 412), and to add the items to the electronic checkout list if successfully classified using such a scanner.

In some embodiments, processing unit 402 causes optical sensor(s) 410 to only scan items when in a particular mode. For example, processing unit 402 may detect whether the trolley is moving (e.g., based on electronic signals from an inertial measurement (IMU) unit of the trolley, or based on electronic signals from motion or other sensors in one of the wheel assemblies, etc.), and trigger one or more of optical sensor(s) 410 to scan an item only when the trolley has stopped moving. Processing unit 402 may then cause the triggered sensor(s) to stop scanning when processing unit 402 detects that motion of the trolley has resumed. Other ones of optical sensor(s) 410 may continue to scan the environment to one or both sides of the trolley even when the trolley is moving, e.g., for one or more of the purposes described below (e.g., to check whether any products need to be restocked, etc.).

In some alternative embodiments, some or all classification operations of processing unit 402 are offloaded to a trolley server. For example, processing unit 402 may forward electronic signals from optical sensor(s) 410 (e.g., representing scanned codes or captured images) and/or weight sensor(s) 412 (representing item weights), or data derived therefrom (e.g., images and/or weights in particular formats, etc.), to a server using a transmitter that implements a short-range or long-range communication protocol of network interface(s) 416. For example, processing unit 402 may forward the information, via the transmitter, using a WiFi (IEEE 802.11 standard) protocol if the server is located in the store, or if a hotspot (WiFi access point) within the store can forward the data to a remote server (e.g., via the Internet). The trolley server may then classify items as discussed above (e.g., using codes or machine learning), and return the results (e.g., item type, or an error code, etc.) to the trolley via the same communication channel(s) and the same interface of network interface(s) 416. If the results indicate successful classification, processing unit 402 may add the item to the electronic checkout list.

Processing unit 402 may add items to the electronic checkout list in various ways, depending on the embodiment. In one embodiment, for example, the electronic checkout list is initially stored only locally (e.g., in memory 404), and transferred to a payment station (e.g., via Bluetooth, WiFi, or another communication protocol implemented by one of network interface(s) 416) when the trolley is brought near the payment station. Alternatively, processing unit 402 may cause a Bluetooth, WiFi, or other communication interface of network interface(s) 416 to continuously or periodically upload the electronic checkout list to a payment station or trolley server (e.g., each time the customer adds an item that is successfully classified, or once every 10 seconds, etc.). In this latter embodiment, it may be necessary for the trolley to be registered at a payment station when the customer is checking out in order to associate the customer/trolley with the electronic checkout list (e.g., as discussed further below in connection with FIG. 5B). Uploading the electronic checkout list continuously or periodically, coupled with registration of the trolley at the payment station, may be advantageous in that it can lessen the chance of inadvertently associating the wrong checkout list with a customer (e.g., if a payment station inadvertently receives a checkout list from another customer/trolley in the queue or just passing by). In an alternative embodiment processing unit 402 does not upload an actual list of items, but only the total cost associated with those items.

In some embodiments, processing unit 402 also (or instead) performs other tasks or operations. If optical sensor(s) 410 include one or more cameras that are positioned (and/or having a wide enough viewing angle) to capture shelves to one or both sides of the trolley, for example, processing unit 402 may analyze the images for one or more purposes. For example, one or more of optical sensor(s) 410 may automatically capture images (e.g., video, or one image every 2 seconds, etc.) of the shelves to both sides of the trolley, and processing unit 402 may process the images to determine stock levels (e.g., to allow the store to better manage the stocking of shelves, such as by replacing products that have been taken by customers), the number of units and/or presentation of a particular product within the store (e.g., to provide a manufacturer or supplier with information indicating whether its products are sufficiently stocked and in a sufficiently accessible/noticeable area of the store), and so on. To this end, processing unit 402 may implement object recognition techniques (e.g., the same machine learning model used to classify items as discussed above, or another machine learning model that is trained using images that were captured from a different, more distant perspective, etc.), and may access databases as needed to obtain corresponding item/product information.

As another example, when processing unit 402 successfully classifies an item, processing unit 402 accesses a database (e.g., stored locally in memory 404, or accessed via one of network interface(s) 416) to identify one or more other items that the user may prefer instead (e.g., cheaper, higher quality, etc.), and causes electronic display 414 to present a message indicating the alternative option(s). The alternative option(s) may briefly flash on electronic display 414, for example. Regardless of whether processing unit 402 provides alternative options, processing unit 402 may remove a previously classified item from the electronic checkout list in response to the customer providing some input (e.g., again scanning the item using optical sensor(s) 410 or a "hot zone" sensor, or entering a touch input on electronic display 414, or providing a voice command, etc.), and electronic signals from one or more of weight sensor(s) 412 indicating the customer took the item out of the trolley basket (e.g., if the decrease in weight matches the expected weight of the removed item).

As another example, processing unit 402 may cause a printer on the trolley (e.g., mounted on or near the handle assembly) to print a receipt for the customer after he or she has approved/arranged payment of the total amount for the items on the electronic checkout list, and/or may cause electronic display 414 to present a selectable option for sending the receipt to the customer's email address, etc.

As another example, the trolley may include a satellite positioning (e.g., GPS) unit (e.g., in the handle assembly), and processing unit 402 may cause the trolley to go into a "lost" or "stolen" mode if the trolley is taken outside of a predetermined area (e.g., off store property, or more than a threshold distance from a latitude/longitude associated with an address of the store, etc.). In lost or stolen mode, processing unit 402 may cause a long-range communication interface of network interface(s) 416 (e.g., a cellular network interface) to broadcast the current location of the trolley at suitable intervals. Processing unit 402 may also disable some or all other functions of the trolley (e.g., item classification functions) when the trolley is in lost or stolen mode.

In some embodiments, processing unit 402 may also manage communications with an app executing on the customer's mobile device, and/or with a payment station, via one or more of network interface(s) 416. Such embodiments will be discussed further below in connection with the example systems and use cases of FIGS. 5 and 6.

Electronic component system 400 also includes a power unit 420, which may provide power (e.g., provide a suitable DC voltage and source sufficient current) to processing unit 402, optical sensor(s) 410, weight sensor(s) 412, electronic display 414, and/or network interface 416. Power unit 420 may include one or more solar powered units (e.g., photovoltaic elements and associated circuitry, such as any of the photovoltaic elements shown in FIGS. 2A through 2C), and/or one or more motion powered units (e.g., a supercap or battery and any associated circuitry, as discussed above in connection with FIG. 3). Power unit 420 may be in one location (e.g., all in the handle assembly) or distributed throughout the trolley (e.g., photovoltaic elements in the handle assembly to power electronic components in the handle assembly, and a supercap in one or more wheel assemblies to power electronic components in those wheel assemblies). In some embodiments, power unit 420 also includes a backup battery, to ensure that various components of the trolley are powered even if the ambient lighting is insufficient for photovoltaic elements, and/or even if the trolley has not moved quickly enough to sufficiently charge a supercap, etc.

Power may be provided via conductive (e.g., metal) cables, wires, traces, etc., that are routed through, or along, various structural components of the trolley. If power unit 420 is in the handle assembly, for example, insulated and/or shielded power wires may be routed from power unit 420 to one or more of optical sensor(s) 410 that are likewise in the handle assembly, and also routed to weight sensor(s) 412 (and possibly one or more other of optical sensor(s) 410) in one or more wheel assemblies via insulated and/or shielded power wires that are glued or otherwise affixed to frame members (e.g., steel wires or tubes) of the trolley basket and chassis. Alternatively, some or all of the power wires may be routed through hollow interiors of frame members of the basket and/or chassis.

In some embodiments, electronic component system 400 includes more, fewer, and/or different components than those shown in FIG. 4. For example, electronic component system 400 may omit optical sensor(s) 410, weight sensor(s) 412, electronic display 414, or network interface 416. Embodiments in which particular components may be omitted will become clear when describing various use cases below in connection with FIGS. 5 and 6.

III. Example Systems and Use Cases for Smart Shopping Trolleys

Various systems in which a smart shopping trolley (e.g., trolley 100 of FIG. 1) may be used, and the corresponding use cases, will now be described with reference to FIGS. 5 and 6. It is understood that smart shopping trolleys may instead be used in systems, or in accordance with use cases, that are different than those shown in FIGS. 5 and 6.

Figure 5A:
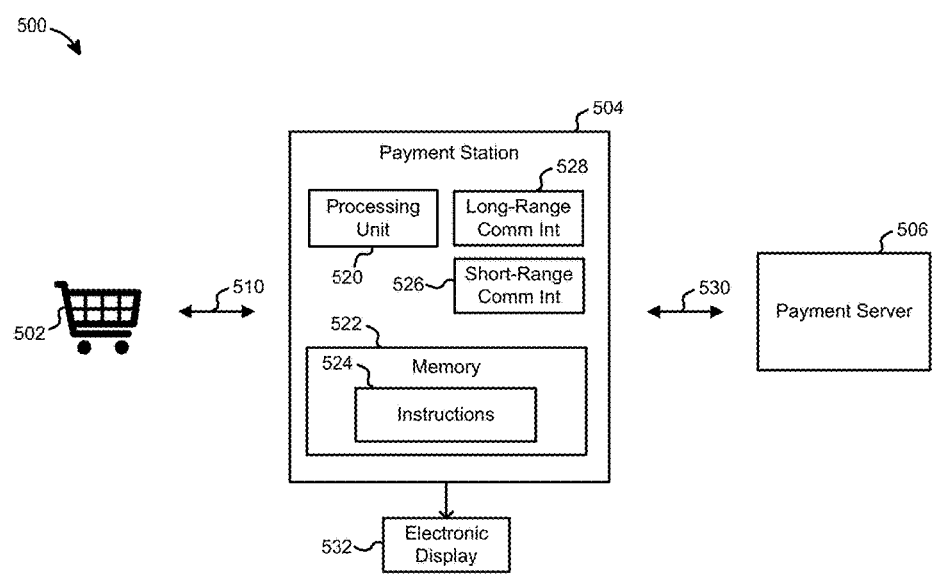
FIG. 5A is a block diagram of an example system in which a smart shopping trolley may be used.
Figure 5B:
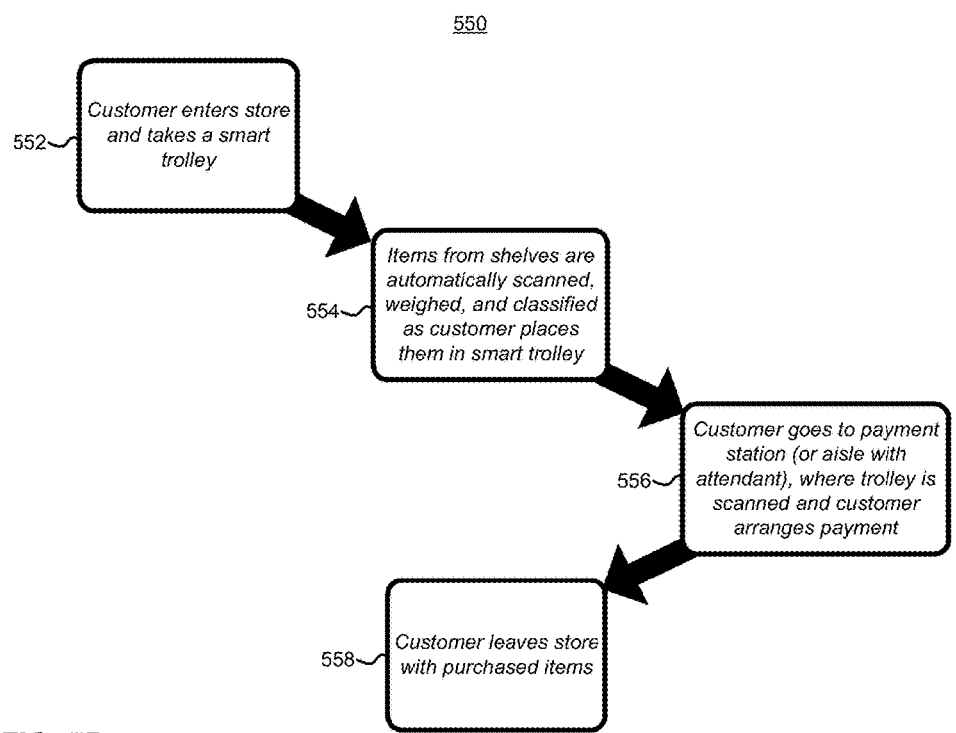
FIG. 5B depicts an example use case corresponding to the system of FIG. 5A.
Figure 6A:
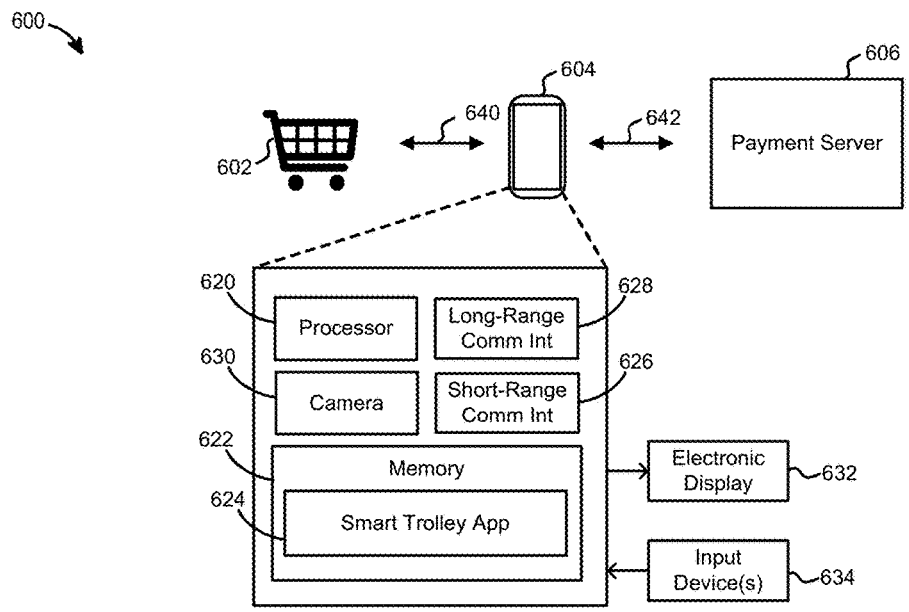
FIG. 6A is a block diagram of another example system in which a smart shopping trolley may be used.
Figure 6B:
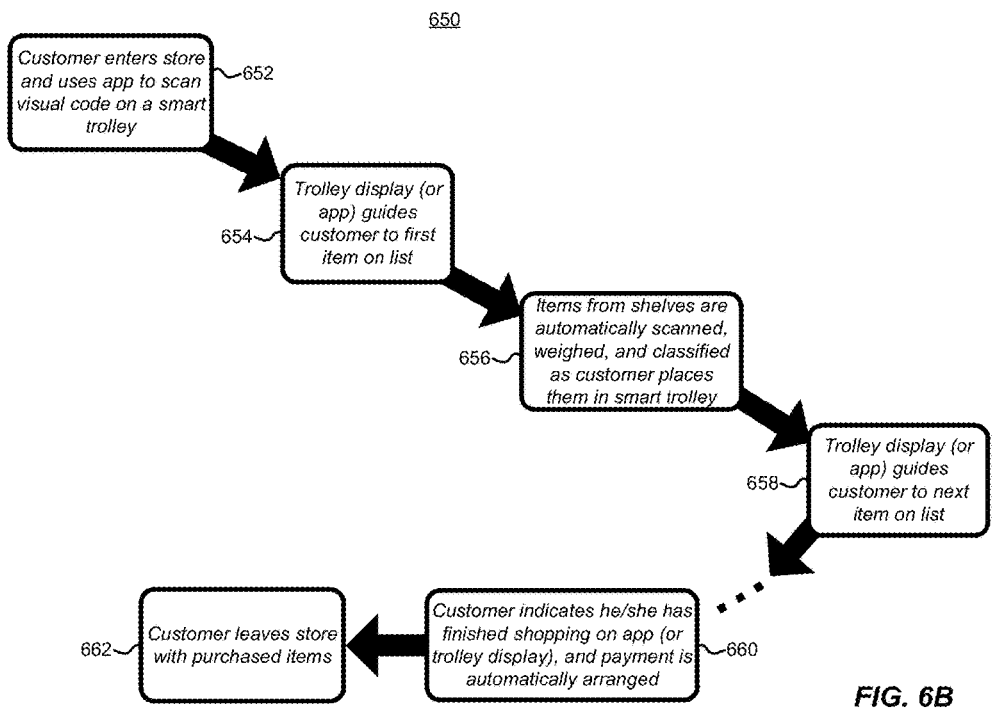
FIG. 6B depicts an example use case corresponding to the system of FIG. 6A.

Generally, FIGS. 5A and 5B correspond to an embodiment and/or scenario in which a customer uses a smart shopping trolley in a "basic" or "unpaired" mode that does not require the customer to have a mobile device executing a specific mobile app, while FIGS. 6A and 6B correspond to an embodiment and/or scenario in which a customer uses a smart shopping trolley in an "advanced" or "paired" mode that does require the customer to have a mobile device executing a specific mobile app. It is understood that, in some embodiments, the same trolley (and possibly the same payment server) may be used in scenarios corresponding to FIG. 5 (when the trolley is used by a customer who does not have the mobile app), and also in scenarios corresponding to FIG. 6 (when the same trolley is used by a customer who does have the mobile app).

FIG. 5A depicts a system 500 that includes a smart shopping trolley 502, a payment station 504, and a payment server 506. Trolley 502 may be trolley 100 of FIG. 1, for example, and may be configured according to any of the trolley embodiments described herein. Payment station 504 is a point-of-sale station that is generally configured to allow smart trolley users (customers) to checkout and arrange payment. Thus, payment station 504 may be positioned at an area that is conventionally associated with checkout procedures (e.g., at a typical location for a self-checkout area). Payment station 504 may be a kiosk, or may be a small computing device that is not visible to customers, for example. If payment station 504 itself is not clearly visible to customers, other means may be used to attract customer attention to the general vicinity of payment station 504 (e.g., a sign stating "SMART TROLLEY CHECKOUT HERE"), or payment station 504 may simply be located at an area that customers must pass through when exiting the store.

In some embodiments (as discussed below in connection with FIG. 5B), trolley 502 communicates with payment station 504 via a short-range communication link 510 when trolley 502 is sufficiently close to payment station 504, and/or when trolley 502 is sufficiently close to a relay point (e.g., one of a number of WiFi access points dispersed throughout the store, each being electrically coupled to payment station 504 via a wired and/or wireless link). Short-range communication link 510 may use a Bluetooth, WiFi, NFC, or other suitable short-range communication protocol, for example.

Payment station 504 includes a processing unit 520, and a memory 522 storing instructions 524. Memory 522 may include one or more volatile and/or non-volatile memories (e.g., ROM, solid state memory, hard drive, etc.). Processing unit 520 may include any suitable number of processors and/or processor types (e.g., one or more central processing units (CPUs), one or more graphics processing units (GPUs), etc.). Generally, processing unit 520 is configured to execute instructions 524. Alternatively, some or all processors of processing unit 520 may be implemented in hardware (e.g., as one or more ASICs, FPGAs, etc.).

In the embodiment shown in FIG. 5A, payment station 504 also includes a short-range communication interface 526 and a long-range communication interface 528. Short-range communication interface 526 may include a transmitter and/or receiver configured to communicate with trolley 502 via short-range communication link 510 (as discussed above), and long-range communication interface 528 may include a transmitter and/or receiver configured to communicate with payment server 506 via a long-range communication link 530 using a long-range communication protocol (e.g., LTE, WiMAX, or another suitable cellular or non-cellular protocol).

Payment station 504 also includes an electronic display 532, which may use any suitable display technology (e.g., LCD, LED, OLED, etc.), and may be a touchscreen that accepts touch inputs. In some embodiments, payment station 504 also includes a speaker and is configured to generate audible outputs, and/or includes a microphone and is configured to recognize voice commands.

Payment server 506 may be remote from payment station 504 (e.g., at a geographic location that is different than the geographic location of the store containing trolley 502 and payment station 504). Payment server 506 may generally be configured to initiate, facilitate and/or process payments from the customer to the store using a bank, credit or debit account of the customer. Payment server 506 may be associated with a bank or credit card network, for example. In some embodiments, one or more computer devices and/or systems not shown in FIG. 5A act as intermediaries between payment station 504 and payment server 506.

Operation of system 500 will now be described with reference to an example use case 550, shown in FIG. 5B. In the description of FIG. 5B that follows, it is understood that some or all processing functions of trolley 502 may be performed by processing unit 402 of FIG. 4, and that some or all functions of other trolley components (e.g., optical sensors, weight sensors, communication interfaces, etc.) may be controlled or managed by processing unit 402.

At stage 552 of use case 550, a customer enters the store and takes smart shopping trolley 502. In at least some embodiments, or some scenarios (e.g., when in unpaired mode), there is no need to register trolley 502 with the customer before he/she begins shopping. At stage 554, the customer takes desired items from the store shelves and places them within the basket of trolley 502, during which time trolley 502 (e.g., one or more of optical sensor(s) 410 of FIG. 4) automatically scans the items by scanning a visual code (e.g., a barcode or QR code) and/or by capturing images of the items, as discussed above. Also at stage 554, trolley 502 automatically classifies the items being added, using the scanned codes and/or images, weight signals (e.g., generated by weight sensor(s) 412), and/or user input (e.g., item description or code), as discussed above.

For any items that trolley 502 cannot classify (e.g., due to unsuccessful classification by a machine learning model, or due to a weight not confirming an initial classification), the customer may hold the barcode (or other visual code) of the item in front of, and near to, a special-purpose or "hot zone" scanner on trolley 502. In some embodiments, when an item is successfully classified by either of these means, trolley 502 adds the item to an electronic checkout list or "virtual cart," and causes an electronic display (e.g., electronic display 414) to show one or more pieces of information about the item (e.g., descriptor, cost, etc.). Trolley 502 may also cause the electronic display to show other information, such as a running total of the items that were successfully classified during that shopping session. Trolley 502 may also perform other functions when an item is successfully classified, such as suggesting one or more alternative products via the display (e.g., as discussed above in connection with FIG. 4). Trolley 502 may update the electronic checkout list in any of the ways described above in connection with FIG. 4 (e.g., periodic uploads to the payment server, or local storage and uploading at the time of checkout), for example.

At stage 556, when the customer has finished gathering items, he or she takes trolley 502 to payment station 504. In some embodiments, as discussed above in connection with FIG. 4, trolley 502 uploads the electronic checkout list (or alternatively, the total cost) to payment station 504 via short-range communication link 510 only after the customer has finished shopping and arrived at payment station 504. In such an embodiment, a graphic user interface (GUI) presented on electronic display 532 of payment station 504 may present the total balance to the customer, who may then use the GUI and/or hardware of payment station 504 to arrange and/or approve payment (e.g., by inserting or swiping a credit card in a reader at payment station 504, or by selecting a pre-authorized payment method, etc.).

In embodiments where trolley 502 instead continuously or periodically updates the electronic checkout list and/or total cost as the customer is shopping (as was also discussed above in connection with FIG. 4), it may be necessary for trolley 502 to register with payment station 504 at stage 556. For example, a visual code (e.g., barcode or QR code) scanner on payment station 504 may automatically scan a code that is printed on, or otherwise affixed to, trolley 502 (e.g., on the handle assembly, or chassis, etc.), and processing unit 520 of payment station 504 may use the scanned code to identify and retrieve the appropriate one of a number of electronic checkout lists of different customers (e.g., all stored in memory 522). In other embodiments, the customer can use a GUI presented on electronic display 532 of payment station 504 to manually enter the trolley code. In any of these embodiments, a GUI on electronic display 532 of payment station 504 may then present the total balance to the customer, and the customer may use the GUI and/or hardware of payment station 504 to arrange and/or approve payment (e.g., by inserting or swiping a credit card in a reader at payment station 504, or selecting a pre-authorized payment method, etc.).

Alternatively, the customer may take trolley 502 to a checkout aisle staffed by an attendant/employee of the store. If the attendant has a terminal or device similar to payment station 504, then checkout may proceed in a manner similar to either of the unmanned payment station embodiments described above. For example, the attendant's terminal/device may be continuously or periodically updated with the electronic checkout list (or may have electronic access to payment station 504 or a similar device in order to retrieve such information), and the attendant may manually use a barcode scanner or other visual code scanner to scan the code on trolley 502 (or may manually enter the code on a computing device, etc.) in order to pair the customer/trolley to the correct electronic checkout list or total cost. Or, trolley 502 may automatically upload the electronic checkout list and/or total cost to the attendant's terminal/device. In either embodiment, the customer may then arrange payment with the attendant using any suitable means (e.g., inserting or swiping a credit card).

Also at stage 556, payment station 504 may initiate payment processing by communicating with payment server 506 via long-range communication link 530. For example, payment station 504 may send the customer's credit card information to payment server 506.

At stage 558, the customer leaves the store with the purchased items still in trolley 502. If the customer had initially placed bags in the basket of trolley 502, the customer may simply transfer the bagged items from trolley 502 to his or her car in the store parking lot, for example, or may carry the bags if walking home, etc. Alternatively (e.g., if optical sensors on wheel assemblies or otherwise underneath the trolley basket should not be blocked by bags), the customer may transfer the loose items in trolley 502 to bags when loading his or her car.

As noted above, FIGS. 6A and 6B are a system and use case, respectively, corresponding to another embodiment, or to another mode (e.g., "advanced" or "paired" mode), in which the customer uses a mobile device on which a specific mobile app (also referred to herein as a "smart trolley app") is installed. Referring first to FIG. 6A, a system 600 includes a smart shopping trolley 602, a customer's mobile device 604, and a payment server 606. Trolley 602 may be trolley 100 of FIG. 1, for example, and may be configured according to any of the trolley embodiments described herein.

Mobile device 604 may be a personal computing device of a customer, such as a smartphone, a tablet, smart glasses, or any other suitable device or combination of devices (e.g., a smart watch plus a smartphone) having display and wireless communication capabilities. In the embodiment of FIG. 6A, mobile device 604 includes a processor 620, a memory 622 storing instructions of a smart trolley software application ("smart trolley app") 624, a short-range communication interface 626, a long-range communication interface 628, a camera 630, one or more input devices 634, and an electronic display 632.

Processor 620 may include any suitable number of processors and/or processor types. Processor 620 may include one or more CPUs and one or more GPUs, for example. Generally, processor 620 is configured to execute software instructions stored in memory 622, including the instructions of smart trolley app 624. It is understood that, when reference is made herein to a function being performed by mobile device 604, processor 620, or smart trolley app 624, the function may be performed by processor 620 executing the instructions of smart trolley app 624 stored in memory 622. Memory 622 may include one or more volatile and/or non-volatile memories (e.g., a hard drive and/or solid state memory). In addition to smart trolley app 624, memory 622 may store data that is used and/or generated by smart trolley app 624.

Short-range communication interface 626 includes hardware, firmware and/or software that is generally configured to communicate with other devices or systems using a short-range communication protocol. For example, short-range communication interface 626 may be configured to transmit and receive data using a Bluetooth protocol, a WiFi protocol, or an NFC protocol. Short-range communication interface 624 may enable mobile device 604 to communicate with trolley 602 via a communication link 640, or may be omitted, in some embodiments.

Long-range communication interface 628 includes hardware, firmware and/or software that is generally configured to transmit and receive data over long-distance wireless networks. For example, long-range communication interface 628 may be configured to communicate using a cellular (e.g., LTE, WiMAX, etc.) protocol. Long-range communication interface 628 may enable mobile device 604 to communicate with a trolley server (not shown in FIG. 6A) and/or payment server 606, or may be omitted, in some embodiments (e.g., as discussed further below in connection with the example use case of FIG. 6B).

Electronic display 632 may use any suitable display technology (e.g., LED, OLED, LCD, etc.) to present information to the user/customer, and input device(s) 634 include(s) one or more components that enable mobile device 604 to accept inputs from the user/customer. For example, input device(s) 634 may include an integrated keyboard and/or a microphone, with associated hardware, software and/or firmware. In some embodiments, at least a portion of input device(s) 634 is integrated with electronic display 632 in the form of a touchscreen display receptive to user touches/gestures. Generally, electronic display 632 and input device(s) 634 may combine to enable a user/customer to interact with GUIs provided by mobile device 604.

Payment server 606 may be similar to payment server 506 of FIG. 5A, as discussed above. For example, payment server 606 may be a server associated with a bank or credit card network. In some embodiments, system 600 includes one or more computing devices and/or systems (not shown in FIG. 6A) acting as intermediaries between mobile device 604 and payment server 606.

Operation of system 600 will now be described with reference to an example use case 650, shown in FIG. 6B. In the description of FIG. 6B that follows, it is understood that some or all processing functions of trolley 602 may be performed by processing unit 402 of FIG. 4, and that some or all functions of other trolley components (e.g., optical sensors, weight sensors, communication interfaces, etc.) may be controlled or managed by processing unit 402.

At stage 652 of use case 650, a customer enters a store and takes smart shopping trolley 602. Prior to entering the store, the customer may have used smart trolley app 624 executing on mobile device 604 to compose a shopping (e.g., grocery) list of items to buy. For example, smart trolley app 624 may be in communication with a remote server (e.g., via long-range communication interface 628) associated with the store, and the server may store descriptors, codes, images, etc., of various types of items/products sold by the store. Smart trolley app 624 may generate a GUI that allows the customer to browse and/or search for items, and add desired items to an electronic shopping list (e.g., stored in memory 622 or at the remote server).

In at least some embodiments, or some scenarios (e.g., when in paired mode), the customer uses camera 630 of mobile device 604 to scan a visual code (e.g., barcode, QR code, number, alphanumeric code, etc.) that is printed on or otherwise affixed to trolley 602. Smart trolley app 624 may provide a "trolley registration" input on a GUI, for example, and in response to the customer selecting that input, smart trolley app 624 may guide the customer through a process for scanning the visual code using camera 630. In an alternative embodiment, smart trolley app 624 provides an input/field that allows the customer to manually enter the code for trolley 602. In yet another embodiment, mobile device 604 automatically obtains a code or identifier of trolley 602 when mobile device 604 and trolley 602 are brought in very close proximity (e.g., via Bluetooth, WiFi, or any other suitable protocol used by short-range communication interface 626). In still another embodiment, smart trolley app 624 provides a GUI that allows the customer to select a specific, nearby trolley from a displayed list (e.g., by using Bluetooth, WiFi, or another short-range communication protocol to discover nearby smart trolleys, and then presenting a list with selectable codes for the discovered trolleys on the GUI). Regardless of the means by which smart trolley app 624 learns a code or identifier of trolley 602, smart trolley app 624 may, in response, link or associate the customer (e.g., an account of the customer) or mobile device 604 to trolley 602. For example, smart trolley app 624 may store the code or identifier in memory 622 for the duration of the shopping session.

At stage 654, either an electronic display of trolley 602 or mobile device 604 presents a first item on the customer's electronic shopping list. For example, smart trolley app 624 may transmit a descriptor or code of the item to trolley 602 via short-range communication interface 626 (e.g., Bluetooth or WiFi), after which trolley 602 (e.g., processing unit 402 of FIG. 4) causes the display (e.g., electronic display 414 of FIG. 4) to present a descriptor (e.g., name, brand, etc.) of the item. Alternatively, smart trolley app 624 may cause a GUI on electronic display 632 to present the item descriptor.

In either case, in some embodiments, the electronic display or GUI may also present information providing guidance to the customer as to how to find the item. For example, mobile device 604 may include a GPS or other positioning unit (not shown in FIG. 6A), and smart trolley app 624 may provide locations of the customer to trolley 602 via short-range communication interface 626. If trolley 602 stores or otherwise has access to a map of the store, the electronic display of trolley 602 may then present a map showing the customer's current location and the item location, or may provide step-by-step or single-step instructions (e.g., "go to aisle 6" or "turn left at next aisle"). Alternatively, trolley 602 may provide item location information to mobile device 604 (e.g., via a Bluetooth or other short-range communication interface of network interface(s) 416 in FIG. 4), and smart trolley app 624 may cause electronic display 632 to present the map, step-by-step, or single-step instructions (e.g., aisle number).

Following the instructions and/or map, or after simply searching for the displayed item from the list, the customer finds the desired item, and takes the item from its shelf. At stage 656, the customer places the item within the basket of trolley 602, during which time trolley 602 (e.g., one or more of optical sensor(s) 410 of FIG. 4) automatically scans the item by scanning a visual code (e.g., a barcode or QR code) and/or by capturing one or more image of the item. Also at stage 656, trolley 602 automatically classifies the item being added, using the scanned codes and/or image(s), weight signal(s) (e.g., generated by weight sensor(s) 412), and/or user input (e.g., item description or code).

Stage 656 may be the same as or similar to any of the embodiments discussed above in connection with stage 554 of use case 550 (e.g., with respect to scanning, classification, use of "hot zones," communication with a trolley server, and so on), for example. However, it is understood that, in certain alternative embodiments, mobile device 604 may instead be used to perform any of the processing and/or display functions described above in connection with stage 554 of use case 550, e.g., by establishing suitable communications with trolley 602. For example, trolley 602 may send electronic signals generated by its optical sensor(s) and/or weight sensor(s) (or data derived therefrom) to mobile device 604 (e.g., via a Bluetooth, WiFi, or other suitable short-range communication interface of network interface(s) 416 in FIG. 4, and short-range communication interface 626 of mobile device 604), and smart trolley app 624 may perform the classification task according to any embodiment described above (e.g., by using item weight to confirm scan results, by using a machine learning model, by using customer-entered item descriptors/identifiers along with item weights, etc.). As another example, in some embodiments where the customer enters item descriptors/identifiers, such entries may be made via a GUI on electronic display 632 rather than by using a display of the trolley.

As yet another example, trolley 602 may still classify items and, for each successfully classified item, transmit a descriptor, code, identifier, etc., of the item to mobile device 604, but smart trolley app 624 (rather than trolley 602) may then add the item to an electronic checkout list for the shopping session (e.g., stored in memory 622), cause a GUI on electronic display 632 to present the item, item cost, and/or a running cost total to the customer, and so on. The GUI may also show alternative products as described above in connection with use case 550.

At stage 658, an electronic display of the trolley (e.g., electronic display 414 of FIG. 4), or electronic display 632 of mobile device 604, guides the customer to the next item on his or her electronic shopping list, in a manner that is the same as or similar to stage 654. Stage 656 may also be repeated for this next item, and the process may continue in an iterative manner until all items on the electronic shopping list (possibly excluding some that the customer deletes on the fly, e.g., using a GUI provided by smart trolley app 624) are in the trolley basket and have been successfully classified.

At stage 660, when the customer has finished gathering items on the electronic shopping list (e.g., after receiving a text-based or other notice that the list is complete on a GUI of mobile device 604 or on the trolley electronic display), he or she may use an input on a GUI of mobile device 604 to indicate he has finished shopping. Alternatively, the customer may enter such an input using a display of trolley 602 (e.g., electronic display 414 of FIG. 4) or a voice recognition unit of trolley 602. After the input is selected, mobile device 604 may automatically initiate payment processing by communicating with payment server 606 via long-range communication link 628, according to a pre-authorized payment method of the customer (e.g., using a particular, preregistered credit card account). For example, mobile device 604 may send the customer's encrypted credit card information to payment server 606. Alternatively, the customer may arrange a payment method via a GUI provided by smart trolley app 624. In still other embodiments, checkout may occur in a manner similar to that described above in connection with stage 556 of use case 550, with the customer taking trolley 602 to a payment station or an aisle with an attendant. In some of these latter embodiments, mobile device 628 does not include (or simply does not use) long-range communication interface 628. In some embodiments, a receipt is printed for the customer (e.g., by a printer on trolley 602), or a receipt is sent to the customer's email account and/or stored on mobile device 604 by smart trolley app 624.

At stage 662, the customer leaves the store with the purchased items still in trolley 602. If the customer had initially placed bags in the basket of trolley 602, the customer may simply transfer the bagged items from trolley 602 to his or her car in the parking lot, for example, or may carry the bags if walking home, etc. Alternatively (e.g., if optical sensors on wheel assemblies or otherwise underneath the trolley basket should not be blocked by bags), the customer may transfer the loose items to bags when loading his or her car.

IV. Example Method of Using a Smart Shopping Trolley

Figure 7:
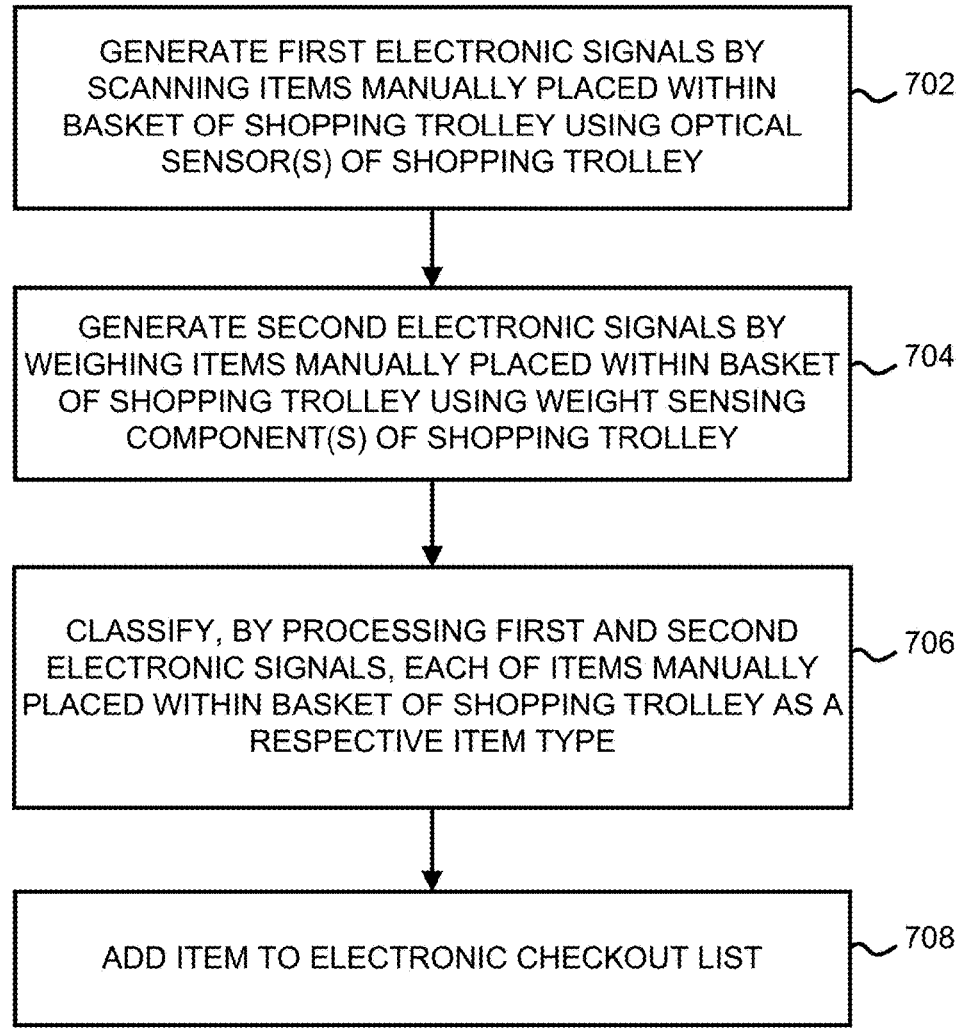
FIG. 7 is a flow diagram of an example method for facilitating checkout of items placed in a smart shopping trolley.

FIG. 7 is a flow diagram of an example method 700 of facilitating checkout of items placed in a smart shopping trolley. The method 700 may be implemented in whole or in part by one or more components of a smart shopping trolley, such as trolley 100 of FIG. 1, trolley 502 of FIG. 5A, or trolley 602 of FIG. 6A, for example.

At block 702 of the method 700, first electronic signals are generated by scanning one or more items that are manually (e.g., by a customer) placed within a basket of the smart shopping trolley (e.g., basket 102 of FIG. 1) using one or more optical sensors of the trolley (e.g., optical sensor(s) 410 of FIG. 4). The first electronic signals may include data representing one or more digital images of the item from one or more perspectives, for example (e.g., if the optical sensor(s) include at least one camera), and/or may include data representing one or more scanned codes on the item (e.g., if the optical sensor(s) include at least one barcode scanner, QR code scanner, or other suitable type of visual code scanner/reader). Depending on the optical sensor placement and viewing angle, the first electronic signals may correspond to times when the items are being placed in (but are not yet resting within) the trolley, and/or may correspond to times when the items are resting within the trolley (e.g., on the trolley basket floor, or in a collapsible compartment within the basket, etc.).

At block 704, second electronic signals are generated by weighing items manually placed within the trolley basket, using one or more weight sensing components of the trolley (e.g., each similar to weight sensing component 310 of FIG. 3). The second electronic signals may include data representing a weight and/or weight distribution of the item, for example. It is understood that block 704 may occur in parallel with block 702, e.g., such that a first item is both scanned and weighed before a second item is scanned and weighed, etc.

At block 706, each item manually placed within the trolley basket is classified as a respective item type (e.g., respective product) by processing the first and second electronic signals generated at blocks 702 and 704, respectively. It is understood that block 704 may occur in parallel with block 702 and/or 704. For example, each item may be classified immediately after that item is scanned and weighed, before waiting for the next item to be scanned and weighed.

The classification at block 706 may occur in different ways, depending on the embodiment. For example, block 706 may include determining an item type by processing the first electronic signals (e.g., to determine a product corresponding to a scanned barcode), and then confirming that item type by processing the second electronic signals (indicative of item weight) and accessing a database of weights or weight ranges corresponding to different item types. As an alternative example, block 706 may include determining an item type by processing the first and second electronic signals using a machine learning model (e.g., if the first electronic signals represent one or more captured images of the item). Moreover, in some embodiments, block 706 may be performed by a processing unit of the trolley, or the classification task may be offloaded to a trolley server, or to the customer's mobile device (if executing a suitable mobile app). In one embodiment, block 706 includes transmitting the first electronic signals (or data derived therefrom) and/or the second electronic signals (or data derived therefrom) to a server via a wireless link, and in response receiving data indicating item types corresponding to the items from the server via the wireless link.

At block 708, the classified item is added to an electronic checkout list. It is understood that block 708 may occur in parallel with blocks 702, 704 and/or 706. For example, each item may be classified and added to the electronic checkout list (if the classification is successful) immediately after that item is scanned and weighed, before the next item is scanned and weighed. Block 708 may also include other operations, such as triggering an audible signal (e.g., using a speaker of the trolley), displaying a name, description and/or price of the item on a display of the trolley, displaying a running total of all items that were successfully classified in the same shopping session, and so on. Moreover, in some embodiments, block 708 may be performed by a processing unit of the trolley, or the classification task may be offloaded to a trolley server, or to the customer's mobile device (if executing a suitable mobile app).

In some embodiments, the method 700 includes more, fewer, and/or different blocks than those shown in FIG. 7. For example, block 704 may be omitted, and block 706 may instead include classifying items by processing the electronic signals generated at block 702, but not processing any electronic signals representing item weight. As another example, block 702 may be replaced by a block in which a customer-entered descriptor or identifier of the item is received (e.g., via a GUI on the customer's mobile device or an electronic display on the trolley), and block 706 may instead include classifying items by processing the electronic signals generated at block 704 and the customer-entered descriptor or identifier, but not processing any electronic signals generated using optical sensors. As yet another example, block 708 may be omitted (e.g., if a total cost is periodically tallied or updated without adding items to any list).

As still another example, the method 700 may include one or more additional blocks in which the optical sensor(s) and/or weight sensing component(s) (and possibly other electronic components, such as a processing unit of the trolley) is/are powered by generating electricity using a motion powered unit within, or coupled to, one or more wheel assemblies of the trolley, and/or by generating electricity using one or more photovoltaic elements (e.g., panels, cells, etc.) within, or coupled to, a handle assembly of the shopping trolley.

As still another example, the method 700 may include one or more additional blocks in which, in response to classifying a given one of the items as a respective item type, an item type of the given item (and/or a total cost of the given item and any other items that were successfully classified by the one or more processors during the shopping session), is/are displayed via an electronic display component of the shopping trolley.

V. Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for improving the shopping experience using a smart shopping trolley, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A shopping trolley comprising:
   a basket including a basket floor and a plurality of basket walls;
   two or more wheel assemblies each including a respective wheel;
   a chassis coupled to the basket and the two or more wheels assemblies;
   a handle assembly coupled to the basket and/or the chassis, wherein the handle assembly includes (i) a handle configured to be gripped by a person manually maneuvering the shopping trolley and (ii) an additional structure extending from, and affixed to, the handle, wherein the additional structure includes one or more optical sensors and one or more photovoltaic elements;
   a processing unit configured to facilitate classification of items scanned by at least one of the one or more optical sensors, at least in part by (i) processing first electronic signals generated by the at least one optical sensor, or (ii) causing a transmitter of the shopping trolley to transmit the first electronic signals, or data derived therefrom, to a server,
   wherein the one or more photovoltaic elements are configured to provide power to the processing unit and the one or more optical sensors.

2. The shopping trolley of claim 1, wherein at least one of the one or more optical sensors is positioned to scan the items as the items enter the basket.

3. The shopping trolley of claim 1, wherein:
   the one or more optical sensors are visual code scanners;
   the first electronic signals include signals indicative of reflected light; and
   the processing unit is configured to facilitate classification of the items at least in part by (i) processing the signals indicative of reflected light to decode visual codes on packaging of the items, and (ii) accessing a database of codes corresponding to different item types.

4. The shopping trolley of claim 1, wherein:
   the one or more optical sensors are cameras;
   the first electronic signals include one or more digital images; and
   the processing unit is configured to facilitate classification of the items at least in part by processing the one or more digital images using a machine learning model that is trained to classify items according to item type.

5. The shopping trolley of claim 1, wherein:
   at least one of the two or more wheel assemblies includes a respective weight sensing component; and
   the processing unit is configured to facilitate classification of the items scanned by the at least one optical sensor at least in part by processing (i) the first electronic signals generated by the at least one optical sensor and (ii) second electronic signals generated by at least one of the one or more weight sensing components and indicative of weights of the items when resting in the basket.

6. The shopping trolley of claim 1, wherein at least one of the two or more wheel assemblies includes a respective additional optical sensor positioned to scan items within the basket.

7. The shopping trolley of claim 1, wherein the shopping trolley further includes a battery backup unit configured to provide power to the processing unit and the one or more optical sensors.

8. The shopping trolley of claim 1, wherein the additional structure is an add-on structure positioned on or above a top side of the handle.

9. The shopping trolley of claim 1, further comprising an electronic display component coupled to the processing unit, wherein the processing unit is configured to cause the electronic display component to display (i) an item type corresponding to an item that is in the basket and was successfully classified by the processing unit, and/or (ii) a total cost of all items that are in the basket and were successfully classified by the processing unit in a given shopping session.

10. The shopping trolley of claim 1, wherein the additional structure includes a substantially flat component extending from, and affixed to, the handle.

11. A shopping trolley add-on kit comprising:
a handle assembly component including one or more optical sensors, wherein the handle assembly component is configured to replace, or couple to, a handle of a shopping trolley;
one or more wheel assembly components each including a respective weight sensing component, wherein each of the one or more wheel assembly components is configured to replace, or couple to, a respective wheel assembly of the shopping trolley and wherein at least one of the one or more wheel assembly components includes a respective additional optical sensor;
a processing unit configured to facilitate classification of items scanned by at least one of the one or more optical sensors and weighed by at least one of the one or more weight sensing components, at least in part by (i) processing first electronic signals generated by the at least one optical sensor and second electronic signals generated by the at least one weight sensing component, or (ii) causing a transmitter of the shopping trolley add-on kit to transmit the first electronic signals, or data derived therefrom, and the second electronic signals, or data derived therefrom, to a server; and
a power unit configured to provide power to at least the processing unit.

12. The shopping trolley add-on kit of claim 11, wherein at least a portion of the processing unit is integrated within the handle assembly component.

13. The shopping trolley add-on kit of claim 11, wherein:
the power unit includes one or more photovoltaic elements of the handle assembly component, the one or more photovoltaic elements being configured to generate electricity in response to light impinging upon the one or more photovoltaic elements; and/or
the power unit includes a motion powered unit within at least one of the one or more wheel assembly components, the motion powered unit being configured to generate electricity in response to rotational movement of a wheel of the respective wheel assembly.

14. The shopping trolley add-on kit of claim 11, further comprising an electronic display component coupled to the processing unit, wherein the processing unit is configured to cause the electronic display component to display (i) an item type corresponding to an item that was successfully classified by the processing unit, and/or (ii) a total cost of all items that were successfully classified by the processing unit in a given shopping session.

15. A shopping trolley comprising:
a basket including a basket floor and a plurality of basket walls;
two or more wheel assemblies each including a respective wheel;
a chassis coupled to the basket and the two or more wheels assemblies;
a handle assembly coupled to the basket and/or the chassis, wherein the handle assembly includes (i) a handle configured to be gripped by a person manually maneuvering the shopping trolley and (ii) one or more optical sensors;
a processing unit configured to facilitate classification of items scanned by at least one of the one or more optical sensors, at least in part by (i) processing first electronic signals generated by the at least one optical sensor, or (ii) causing a transmitter of the shopping trolley to transmit the first electronic signals, or data derived therefrom, to a server; and
a power unit configured to provide power to the processing unit and the one or more optical sensors,
wherein at least one of the two or more wheel assemblies includes a respective additional optical sensor positioned to scan items within the basket.

16. The shopping trolley of claim 15, wherein at least one of the one or more optical sensors is positioned to scan the items as the items enter the basket.

17. The shopping trolley of claim 15, wherein:
the one or more optical sensors are visual code scanners;
the first electronic signals include signals indicative of reflected light; and
the processing unit is configured to facilitate classification of the items at least in part by (i) processing the signals indicative of reflected light to decode visual codes on packaging of the items, and (ii) accessing a database of codes corresponding to different item types.

18. The shopping trolley of claim 15, wherein:
the one or more optical sensors are cameras;
the first electronic signals include one or more digital images; and
the processing unit is configured to facilitate classification of the items at least in part by processing the one or more digital images using a machine learning model that is trained to classify items according to item type.

19. The shopping trolley of claim 15, wherein:
at least one of the two or more wheel assemblies includes a respective weight sensing component; and
the processing unit is configured to facilitate classification of the items scanned by the at least one optical sensor at least in part by processing (i) the first electronic signals generated by the at least one optical sensor and (ii) second electronic signals generated by at least one of the one or more weight sensing components and indicative of weights of the items when resting in the basket.

20. A shopping trolley comprising:
a basket including a basket floor and a plurality of basket walls;
two or more wheel assemblies each including a respective wheel;
a chassis coupled to the basket and the two or more wheels assemblies;
a handle assembly coupled to the basket and/or the chassis, wherein the handle assembly includes (i) a handle configured to be gripped by a person manually maneuvering the shopping trolley and (ii) one or more optical sensors;

a processing unit configured to facilitate classification of items scanned by at least one of the one or more optical sensors, at least in part by (i) processing first electronic signals generated by the at least one optical sensor, or (ii) causing a transmitter of the shopping trolley to transmit the first electronic signals, or data derived therefrom, to a server; and a power unit configured to provide power to the processing unit and the one or more optical sensors, wherein the handle assembly includes an add-on structure coupled to the handle, the add-on structure being positioned on or above a top side of the handle and including the one or more optical sensors, wherein the power unit includes one or more photovoltaic elements, and wherein the add-on structure includes the one or more photovoltaic elements.

21. The shopping trolley of claim 20, wherein at least one of the one or more optical sensors is positioned to scan the items as the items enter the basket.

22. The shopping trolley of claim 20, wherein:
the one or more optical sensors are visual code scanners;
the first electronic signals include signals indicative of reflected light; and
the processing unit is configured to facilitate classification of the items at least in part by (i) processing the signals indicative of reflected light to decode visual codes on packaging of the items, and (ii) accessing a database of codes corresponding to different item types.

23. The shopping trolley of claim 20, wherein:
the one or more optical sensors are cameras;
the first electronic signals include one or more digital images; and
the processing unit is configured to facilitate classification of the items at least in part by processing the one or more digital images using a machine learning model that is trained to classify items according to item type.

24. The shopping trolley of claim 20, wherein:
at least one of the two or more wheel assemblies includes a respective weight sensing component; and
the processing unit is configured to facilitate classification of the items scanned by the at least one optical sensor at least in part by processing (i) the first electronic signals generated by the at least one optical sensor and (ii) second electronic signals generated by at least one of the one or more weight sensing components and indicative of weights of the items when resting in the basket.

* * * * *